United States Patent
Sambonsugi

(10) Patent No.: US 8,400,542 B2
(45) Date of Patent: Mar. 19, 2013

(54) IMAGE SENSOR AND IMAGE CAPTURE APPARATUS

(75) Inventor: Hideaki Sambonsugi, Tokyo (JP)

(73) Assignee: Canon Kabushiki Kaisha, Tokyo (JP)

(\*) Notice: Subject to any disclaimer, the term of this patent is extended or adjusted under 35 U.S.C. 154(b) by 72 days.

(21) Appl. No.: 12/981,673

(22) Filed: Dec. 30, 2010

(65) Prior Publication Data

US 2011/0181764 A1 Jul. 28, 2011

(30) Foreign Application Priority Data

Jan. 26, 2010 (JP) ................................. 2010-014674

(51) Int. Cl.
*H04N 5/335* (2006.01)
(52) U.S. Cl. ..................................................... 348/301
(58) Field of Classification Search .................. 348/308, 348/294, 300–302; 250/208.1
See application file for complete search history.

(56) References Cited

U.S. PATENT DOCUMENTS

| 6,947,088 B2 * | 9/2005 | Kochi ............................ 348/308 |
| 7,256,381 B2 | 8/2007 | Asaba | |
| 7,489,352 B2 * | 2/2009 | Nakamura ..................... 348/296 |
| 7,521,659 B2 * | 4/2009 | Asaba et al. ................ 250/208.1 |
| 2004/0096124 A1 * | 5/2004 | Nakamura ..................... 382/308 |

FOREIGN PATENT DOCUMENTS

JP 2005-244995 9/2005

\* cited by examiner

*Primary Examiner* — Chieh M Fan
*Assistant Examiner* — Ahmed A Berhan
(74) *Attorney, Agent, or Firm* — Cowan, Liebowitz & Latman, P.C.

(57) ABSTRACT

An image sensor having a plurality of pixels two-dimensionally arranged in a row direction and a column direction, comprises a plurality of pixel amplifiers which are arranged in the row direction for each column, and one of which is shared by at least two pixels of each column; two output lines arranged for each column, to either of which signals are output from the plurality of pixel amplifiers arranged in the row direction for each column; and an averaging unit which averages signals output from the two output lines arranged for the same column.

5 Claims, 10 Drawing Sheets

FIG. 3

| G11 | B11 | G13 | B12 | G15 | B13 |
|-----|-----|-----|-----|-----|-----|
| R11 | G12 | R12 | G14 | R13 | G16 |
| G11 | B11 | G13 | B12 | G15 | B13 |
| R11 | G12 | R12 | G14 | R13 | G16 |
| G11 | B11 | G13 | B12 | G15 | B13 |
| R11 | G12 | R12 | G14 | R13 | G16 |
| G11 | B11 | G13 | B12 | G15 | B13 |
| R11 | G12 | R12 | G14 | R13 | G16 |
| G21 | B21 | G23 | B22 | G25 | B23 |
| R21 | G22 | R22 | G24 | R23 | G26 |
| G21 | B21 | G23 | B22 | G25 | B23 |
| R21 | G22 | R22 | G24 | R23 | G26 |
| G21 | B21 | G23 | B22 | G25 | B23 |
| R21 | G22 | R22 | G24 | R23 | G26 |
| G21 | B21 | G23 | B22 | G25 | B23 |
| R21 | G22 | R22 | G24 | R23 | G26 |

| G11 | B11 | G13 | B12 | G15 | B13 |
|---|---|---|---|---|---|
| R | G | R | G | R | G |
| G11 | B11 | G13 | B12 | G15 | B13 |
| R | G | R | G | R | G |
| G11 | B11 | G13 | B12 | G15 | B13 |
| R11 | G12 | R12 | G14 | R13 | G16 |
| G11 | B11 | G13 | B12 | G15 | B13 |
| R11 | G12 | R12 | G14 | R13 | G16 |
| G | B | G | B | G | B |
| R11 | G12 | R12 | G14 | R13 | G16 |
| G | B | G | B | G | B |
| R11 | G12 | R12 | G14 | R13 | G16 |
| G21 | B21 | G23 | B22 | G25 | B23 |
| R | G | R | G | R | G |
| G21 | B21 | G23 | B22 | G25 | B23 |
| R | G | R | G | R | G |
| G21 | B21 | G23 | B22 | G25 | B23 |
| R21 | G22 | R22 | G24 | R23 | G26 |
| G21 | B21 | G23 | B22 | G25 | B23 |
| R21 | G22 | R22 | G24 | R23 | G26 |
| G | B | G | B | G | B |
| R21 | G22 | R22 | G24 | R23 | G26 |
| G | B | G | B | G | B |
| R21 | G22 | R22 | G24 | R23 | G26 |

FIG. 6

IMAGE SENSOR AND IMAGE CAPTURE APPARATUS

BACKGROUND OF THE INVENTION

1. Field of the Invention

The present invention relates to a technique of shortening a readout time in an image sensor having a plurality of pixels arranged in a matrix topology in the horizontal and vertical directions.

2. Description of the Related Art

In recent years, along with an increase in number of pixels of an image sensor, it is necessary to ensure a given frame rate. To do this, the pixels of an image sensor, the number of which has been increased, need to be thinned out and then read out. If, however, the pixels are thinned out and then read out, the image quality drops due to a loss of the information of pixels.

To solve such problem, Japanese Patent Laid-Open No. 2005-244995 has proposed a method in which pixels with the same color are connected to an output circuit, added, and then read out.

The conventional technique, however, suffers the following problem. That is, in Japanese Patent Laid-Open No. 2005-244995, it is possible to add only two pixels. In order to further shorten a readout time, there is no choice but to thin out and then read out pixels, thereby deteriorating the image quality.

SUMMARY OF THE INVENTION

The present invention has been made in consideration of the above problem, and makes it possible to shorten a readout time in capturing a moving image while maintaining the image quality by increasing the number of pixels to be added or the number of pixels to be averaged in the vertical direction.

According to the first aspect of the present invention, there is provided an image sensor having a plurality of pixels two-dimensionally arranged in a row direction and a column direction, comprising: a plurality of pixel amplifiers which are arranged in the row direction for each column, and one of which is shared by at least two pixels of each column; two output lines arranged for each column, to either of which signals are output from the plurality of pixel amplifiers arranged in the row direction for each column; and an averaging unit which averages signals output from the two output lines arranged for the same column.

According to the second aspect of the present invention, there is provided an image capture apparatus comprising: an image sensor having a plurality of pixels two-dimensionally arranged in a row direction and a column direction, and including a plurality of pixel amplifiers which are arranged in the row direction for each column and one of which is shared by at least two pixels of each column, two output lines arranged for each column, to either of which signals are output from the plurality of pixel amplifiers arranged in the row direction for each column, and an averaging unit which averages signals output from the two output lines arranged for the same column; and a signal processing unit which performs predetermined signal processing for an image signal output from the image sensor.

Further features of the present invention will become apparent from the following description of exemplary embodiments with reference to the attached drawings.

BRIEF DESCRIPTION OF THE DRAWINGS

FIG. 3 is a view showing output signals of the image sensor according to the first embodiment of the present invention;

FIG. 6 is a view showing output signals of the image sensor according to the second embodiment of the present invention;

DESCRIPTION OF THE EMBODIMENTS

First Embodiment

Figure 1:
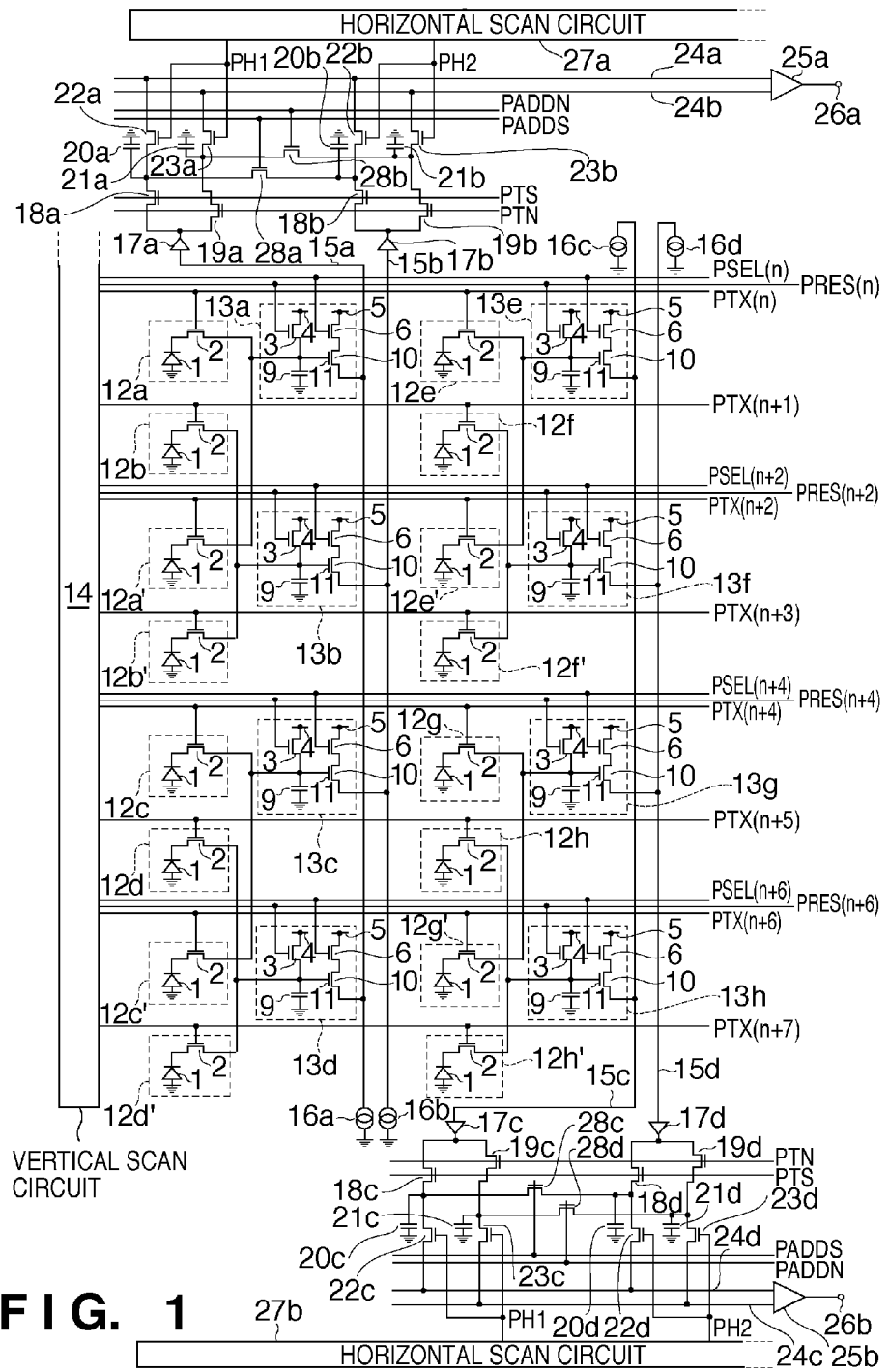
FIG. 1 is a circuit diagram showing the arrangement of an image sensor according to the first embodiment of the present invention.

FIG. 1 is a circuit diagram showing the arrangement of an image sensor according to the first embodiment of the present invention. The image sensor of the embodiment is a CMOS image sensor having a plurality of pixels two-dimensionally arranged in a row direction as the horizontal direction and a column direction as the vertical direction. Referring to FIG. 1, the effective pixel region of the image sensor is formed by a set of pixels 12$a$, 12$a'$, 12$b$, 12$b'$, 12$c$, 12$c'$, 12$d$, and 12$d'$ arranged in the vertical direction. A set of the pixels 12$a$, 12$b$, 12$a'$, and 12$b'$ are arranged in the vertical direction in the order named. Below them, a set of the pixels 12$c$, 12$d$, 12$c'$, and 12$d'$ are arranged in the vertical direction in the order named. Each of the pixels 12$a$, 12$a'$, 12$b$, 12$b'$, 12$c$, 12$c'$, 12$d$, and 12$d'$ has a photodiode 1 and a transfer switch 2. The effective pixel region is provided with signal transfer units 13$a$, 13$b$, 13$c$, and 13$d$, each of which is shared by two pixels and has a reset switch 3, power supplies 4 and 5, a row selection switch 6, a capacitor 9, and a pixel amplifier 10. Reference numeral 11 denotes a gate for the pixel amplifier 10. The signal transfer unit 13$a$ is connected with a set of the two pixels 12$a$ and 12$a'$. Similarly, the signal transfer units 13$b$, 13$c$, and 13$d$ are connected with sets of the pixels 12$b$ and 12$b'$, 12$c$ and 12$c'$, and 12$d$ and 12$d'$, respectively.

With such pixel arrangement, two pixels can share a reset switch, pixel amplifier, and row selection switch, which were conventionally needed for each pixel. Consequently, while two pixels are conventionally constituted by eight Trs (transistors), it is possible to configure two pixels by five Trs (transistors) in the pixel arrangement of this embodiment, thereby obtaining an effect of ensuring the relatively large area of the photodiode 1.

Of the set of the pixels 12$a$ and 12$a'$, the gate of the transfer switch 2 of the pixel 12$a$ is connected to a control signal PTX(n) from a vertical scan circuit 14. The gate of the transfer switch 2 of the pixel 12$a'$ is connected to a control signal PTX(n+2) from the vertical scan circuit 14. Furthermore, the gate of the transfer switch 2 of the pixel 12$b$ is connected to a control signal PTX(n+1) from the vertical scan circuit 14. The gate of the transfer switch 2 of the pixel 12b' is connected to a control signal PTX(n+3) from the vertical scan circuit 14.

Similarly, the gates of the transfer switches 2 of the set of the pixels 12c and 12c' are connected to control signals PTX(n+4) and PTX(n+6), respectively. The gates of the transfer switches 2 of the set of the pixels 12d and 12d' are connected to control signals PTX(n+5) and PTX(n+7), respectively.

The gate of the reset switch 3 of the signal transfer unit 13a is connected to a control signal PRES(n) from the vertical scan circuit 14, and the gate of the row selection switch 6 is connected to a control signal PSEL(n) from the vertical scan circuit 14. The gate of the reset switch 3 of the signal transfer unit 13b is connected to a control signal PRES(n+2) from the vertical scan circuit 14, and the gate of the row selection switch 6 is connected to a control signal PSEL(n+2) from the vertical scan circuit 14. Similarly, the gates of the reset switches 3 of the signal transfer units 13c and 13d are connected to control signals PRES(n+4) and PRES(n+6), respectively. The gates of the row selection switches 6 are connected to control signals PSEL(n+4) and PSEL(n+6), respectively.

The successive signal transfer units 13a and 13d are respectively connected to a vertical output line 15a running through the image sensor. The successive signal transfer units 13b and 13c are respectively connected to a vertical output line 15b. Two vertical output lines existing for each pixel column are alternately connected with two successive signal transfer units. Consequently, connection of the signal transfer units 13a and 13b with the two vertical output lines 15a and 15b is symmetrical to connection of the signal transfer units 13c and 13d with the vertical output lines 15a and 15b with respect to the boundary between the signal transfer units 13b and 13c.

Similarly, a set of pixels 12e, 12e', 12f, 12f', 12g, 12g', 12h, and 12h' adjacent to the column in which the set of the pixels 12a, 12a', 12b, 12b', 12c, 12c', 12d, and 12d' are arranged have the following arrangement.

That is, referring to FIG. 1, the vertical direction of the effective pixel region of the image sensor is formed by the set of the pixels 12e, 12e', 12f, 12f', 12g, 12g', 12h, and 12h'. A set of the pixels 12e, 12f, 12e', and 12f' are arranged in the vertical direction in the order named. Below them, a set of the pixels 12g, 12h, 12g', and 12h' are arranged in the vertical direction in the order named. Each of the pixels 12e, 12e', 12f, 12f', 12g, 12g', 12h, and 12h' has a photodiode 1 and a transfer switch 2. The effective pixel region is provided with signal transfer units 13e, 13f, 13g, and 13h, each of which has a reset switch 3, a pixel amplifier 10, and a row selection switch 6.

The signal transfer unit 13e is connected with a set of the two pixels 12e and 12e'. Similarly, the signal transfer units 13f, 13g, and 13h are connected with sets of the pixels 12f and 12f', 12g and 12g', and 12h and 12h', respectively.

Of the set of the pixels 12e and 12e', the gate of the transfer switch 2 of the pixel 12e is connected to the control signal PTX(n) from the vertical scan circuit 14. The gate of the transfer switch 2 of the pixel 12e' is connected to the control signal PTX(n+2) from the vertical scan circuit 14. Furthermore, the gate of the transfer switch 2 of the pixel 12f is connected to the control signal PTX(n+1) from the vertical scan circuit 14. The gate of the transfer switch 2 of the pixel 12f' is connected to the control signal PTX(n+3) from the vertical scan circuit 14.

Similarly, the gates of the transfer switches 2 of the set of the pixels 12g and 12g' are connected to the control signals PTX(n+4) and PTX(n+6), respectively. The gates of the transfer switches 2 of the set of the pixels 12h and 12h' are connected to the control signals PTX(n+5) and PTX(n+7), respectively.

The gate of the reset switch 3 of the signal transfer unit 13e is connected to the control signal PRES(n) from the vertical scan circuit 14, and the gate of the row selection switch 6 is connected to the control signal PSEL(n) from the vertical scan circuit 14. The gate of the reset switch 3 of the signal transfer unit 13f is connected to the control signal PRES(n+2) from the vertical scan circuit 14, and the gate of the row selection switch 6 is connected to the control signal PSEL(n+2) from the vertical scan circuit 14. Similarly, the gates of the reset switches 3 of the signal transfer units 13g and 13h are connected to the control signals PRES(n+4) and PRES(n+6), respectively. The gates of the row selection switches 6 are connected to the control signals PSEL(n+4) and PSEL(n+6), respectively.

The signal transfer units 13e and 13h are respectively connected to a vertical output line 15c running through the image sensor. The signal transfer units 13f and 13g are respectively connected to a vertical output line 15d. Two vertical output lines existing for each pixel column are alternately connected with two successive signal transfer units. Consequently, connection of the signal transfer units 13e and 13f with the two vertical output lines 15c and 15d is symmetrical to connection of the signal transfer units 13g and 13h with the vertical output lines 15c and 15d with respect to the boundary between the signal transfer units 13f and 13g.

The vertical output lines 15a and 15b for an odd numbered column are driven by constant current sources 16a and 16b, and connected to column amplifiers 17a and 17b, respectively. Note that the column amplifiers 17a and 17b are arranged at the upper side of the effective pixel region. The outputs of the column amplifiers 17a and 17b are connected to holding capacitors 20a and 20b via transfer gates 18a and 18b, and to holding capacitors 21a and 21b via transfer gates 19a and 19b, respectively. Furthermore, the outputs of the column amplifiers 17a and 17b are respectively connected to common horizontal output lines 24a and 24b through output transfer switches 22a and 22b, and 23a and 23b driven by control signals PH1 and PH2 from a horizontal scan circuit 27a. The horizontal output lines 24a and 24b are connected with a readout amplifier 25a which outputs a signal obtained by multiplying a difference output of the horizontal output lines 24a and 24b with a predetermined gain. The output signal of the readout amplifier 25a is output outside from an output terminal 26a of the image sensor.

Similarly, the vertical output lines 15c and 15d for an even numbered column are driven by constant current sources 16c and 16d, and connected to column amplifiers 17c and 17d, respectively. Note that the column amplifiers 17c and 17d are arranged at the lower side (the opposite side of the column amplifiers 17a and 17b) of the effective pixel region. The outputs of the column amplifiers 17c and 17d are connected to holding capacitors 20c and 20d via transfer gates 18c and 18d, and to holding capacitors 21c and 21d via transfer gates 19c and 19d, respectively. Furthermore, the outputs of the column amplifiers 17c and 17d are respectively connected to common horizontal output lines 24c and 24d through output transfer switches 22c and 22d, and 23c and 23d driven by control signals PH1 and PH2 from a horizontal scan circuit 27b. The horizontal output lines 24c and 24d are connected with a readout amplifier 25b which outputs a signal obtained by multiplying a difference output of the horizontal output lines 24c and 24d with a predetermined gain. The output signal of the readout amplifier 25b is output outside from an output terminal 26b of the image sensor.

The holding capacitors 20a and 20b are connected with each other by an output from a circuit (not shown) within the image sensor or by a switch 28a controlled by externally input PADDS. The holding capacitors 21a and 21b are connected with each other by an output from a circuit (not shown) within the image sensor or by a switch 28b controlled by externally input PADDN.

Similarly, the holding capacitors 20c and 20d are connected with each other by an output from a circuit (not shown) within the image sensor or by a switch 28c controlled by externally input PADDS. The holding capacitors 21c and 21d are connected with each other by an output from a circuit (not shown) within the image sensor or by a switch 28d controlled by externally input PADDN.

Figure 2:
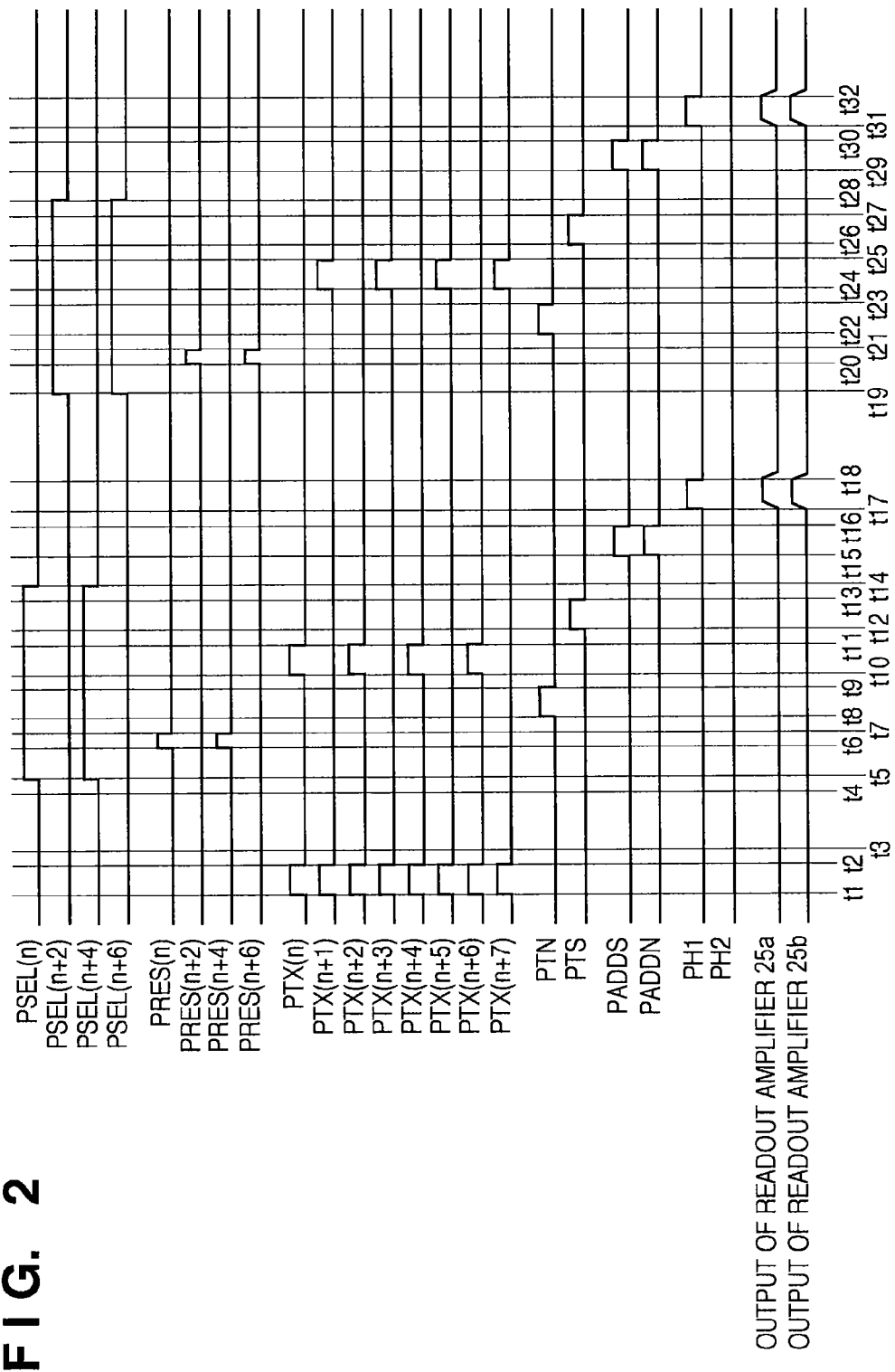
FIG. 2 is a timing chart showing the operation of the image sensor according to the first embodiment of the present invention.

FIG. 2 is a timing chart showing the operation timings of the image sensor in FIG. 1. The operation of each unit will be explained with reference to FIG. 2.

During a reset period for all pixels from t1 to t2, the control signals PTX(n), PTX(n+1), PTX(n+2), PTX(n+3), PTX(n+4), PTX(n+5), PTX(n+6), and PTX(n+7) are activated. Only control signals for specific rows are shown. However, control signals PTXes for all rows are activated during the period. The electrical charges of the photodiodes 1 of a set of all the pixels are transferred to the gates 11 of the pixel amplifiers 10 via the transfer switches 2, respectively, to reset the photodiodes 1.

At a time t3, all the pixels simultaneously start accumulation. At a time t4, a mechanism (not shown) outside the image sensor blocks light entering the image sensor. A period from t3 to t4 is an accumulation period, in which each photodiode 1 accumulates signal charges. Note that although all the pixels simultaneously start accumulation in this example, the present invention is not limited to this. For example, the photodiodes 1 may be reset for each row.

An operation of reading out the accumulated signal charges starts next. At a time t5, the control signals PSEL(n) and PSEL(n+4) are activated, thereby turning on the row selection switches 6. A source follower circuit which includes the pixel amplifiers 10 of the signal transfer units 13a and 13e arranged in the nth row and the signal transfer units 13c and 13g arranged in the (n+4)th row, and the current sources 16a, 16b, 16c, and 16d connected to the vertical output lines enters an operation state.

At a time t6, the control signals PRES(n) and PRES(n+4) are activated, thereby turning on the reset switches 3. The gates 11 of the pixel amplifiers 10, that is, the capacitors 9, in the signal transfer units 13a, 13c, 13e, and 13g are initialized. That is, signals at signal levels (so-called dark levels) immediately after the reset operation are output to the vertical output lines 15a, 15b, 15c, and 15d, respectively.

At a time t7, the control signals PRES(n) and PRES(n+4) are negated. Then, at a time t8, PTN is activated. This turns on the transfer gates 19a, 19b, 19c, and 19d connected to the outputs of the column amplifiers 17a, 17b, 17c, and 17d connected to the vertical output lines 15a, 15b, 15c, and 15d, respectively. The holding capacitors 21a, 21b, 21c, and 21d hold the dark-level outputs, respectively. After the transfer operation is completed at a time t9, the control signals PTX(n), PTX(n+2), PTX(n+4), and PTX(n+6) are activated at a time t10, thereby turning on the transfer switches 2 of the set of the pixels 12a, 12a', 12c, 12c', 12e, 12e', 12g, and 12g'. The signal charges accumulated in the corresponding photodiode 1 are transferred to the gate 11 of a source follower formed by the pixel amplifier 10 of each of the signal transfer units 13a, 13c, 13e, and 13g. At this time, in the gate 11 of the source follower formed by the pixel amplifier 10, the electric potential varies from a reset level by an amount corresponding to the transferred signal charges, thereby settling the signal level.

In this operation, the signal charges are transferred from the set of the pixels 12a and 12a' to the gate of the signal transfer unit 13a. A variation of the electric potential from the reset level corresponds to two pixels. That is, the variation is obtained by adding signals from two pixels. The same goes for the signal transfer unit 13c, 13e, or 13g.

At a time t11 when the transfer operation adequately ends, the control signals PTX(n), PTX(n+2), PTX(n+4), and PTX(n+6) are negated. Then, at a time t12, PTS is activated. This turns on the transfer gates 18a, 18b, 18c, and 18d connected to the outputs of the column amplifiers 17a, 17b, 17c, and 17d connected to the vertical output lines 15a, 15b, 15c, and 15d, respectively. The holding capacitors 20a, 20b, 20c, and 20d hold signal levels, respectively. After that, when PTS is negated at a time t13, the transfer operation is completed.

With the above operations, the holding capacitor 20a holds the added signal level of the set of the pixels 12a and 12a', and the holding capacitor 20b holds the added signal level of the set of the pixels 12c and 12c'. Similarly, the holding capacitor 20c holds the added signal level of the set of the pixels 12e and 12e', and the holding capacitor 20d holds the added signal level of the set of the pixels 12g and 12g'. The holding capacitors 21a, 21b, 21c, and 21d hold the dark levels of the sets of the pixels 12a and 12a', 12c and 12c', 12e and 12e', and 12g and 12g', respectively.

Since the signal output operation from the pixels is complete, the row selection control signals PSEL(n) and PSEL(n+4) are negated at a time t14.

At a time t15, the control signals PADDS and PADDN are activated, thereby turning on the switches 28a, 28b, 28c, and 28d. With this operation, the holding capacitors 20a and 20b, 21a and 21b, 20c and 20d, and 21c and 21d are respectively short-circuited. The holding capacitor 20a holds a signal obtained by averaging the added signal of the set of the pixels 12a and 12a' and that of the set of the pixels 12c and 12c'. The holding capacitor 20c holds a signal obtained by averaging the added signal of the set of the pixels 12e and 12e' and that of the set of the pixels 12g and 12g'. The holding capacitor 21a holds an average of the dark levels of the sets of the pixels 12a and 12a', and 12c and 12c'. The holding capacitor 21c holds an average of the dark levels of the sets of the pixels 12e and 12e', and 12g and 12g'. At a time t16, the control signals PADDS and PADDN are negated, and then the averaging operation is completed.

The horizontal scan circuits 27a and 27b control the output transfer switches 22a, 23a, 22c, and 23c to perform an operation of connecting the holding capacitors 20a, 21a, 20c, and 21c to the horizontal output lines. When the control signal PH1 is turned on at a time t17, the horizontal output line 24a is connected with the holding capacitor 20a via the transfer switch 22a, and the horizontal output line 24b is connected with the holding capacitor 21a via the transfer switch 23a. That is, at this time, an average of the dark levels of the set of the pixels 12a, 12a', 12c, and 12c', and an average signal level of the set of the pixels 12a, 12a', 12c, and 12c' are input to the readout amplifier 25a, which outputs a signal obtained by multiplying the difference between the input data with the predetermined gain.

Similarly, the horizontal output line 24c is connected with the holding capacitor 20c via the transfer switch 22c, and the horizontal output line 24d is connected with the holding capacitor 21c via the transfer switch 23c. That is, at this time, an average of the dark levels of the set of the pixels 12e, 12e', 12g, and 12g', and an average signal level of the set of the pixels 12e, 12e', 12g, and 12g' are input to the readout amplifier 25b, which outputs a signal obtained by multiplying the difference between the input data with the predetermined gain.

With the above operations, output of the pixel signals in the nth, (n+2)th, (n+4)th, and (n+6)th rows is completed. Note that although only two columns are described in this embodiment, the above-mentioned operations are sequentially repeated up to the last column by using the two columns as a unit.

Next, an operation of reading out the (n+1)th, (n+3)th, (n+5)th, and (n+7)th rows will be explained.

At a time t19, the control signals PSEL(n+2) and PSEL(n+6) are activated, thereby turning on the row selection switches 6. A source follower circuit which includes the pixel amplifiers 10 of the signal transfer units 13b and 13f arranged in the (n+2)th row and the signal transfer units 13d and 13h arranged in the (n+6)th row, and the current sources 16a, 16b, 16c, and 16d connected to the vertical output lines enters an operation state.

At a time t20, the control signals PRES(n+2) and PRES(n+6) are activated, thereby turning on the reset switches 3. The gates 11 of the pixel amplifiers 10, that is, the capacitors 9, in the signal transfer units 13b, 13d, 13f, and 13h are initialized. That is, signals at signal levels (so-called dark levels) immediately after the reset operation are output to the vertical output lines 15b, 15a, 15d, and 15c, respectively.

At a time t21, the control signals PRES(n+2) and PRES(n+6) are negated. Then, at a time t22, PTN is activated. This turns on the transfer gates 19b, 19a, 19d, and 19c connected to the outputs of the column amplifiers 17b, 17a, 17d, and 17c connected to the vertical output lines 15b, 15a, 15d, and 15c, respectively. The holding capacitors 21b, 21a, 21d, and 21c hold the dark-level outputs, respectively. After the transfer operation is completed at a time t23, the control signals PTX(n+1), PTX(n+3), PTX(n+5), and PTX(n+7) are activated at a time t24, thereby turning on the transfer switches 2 of the set of the pixels 12b, 12b', 12d, 12d', 12f, 12f', 12h, and 12h'. The signal charges accumulated in the corresponding photodiode 1 are transferred to the gate 11 of a source follower formed by the pixel amplifier 10 of each of the signal transfer units 13b, 13d, 13f, and 13h. At this time, in the gate 11 of the source follower formed by the pixel amplifier 10, the electric potential varies from a reset level by an amount corresponding to the transferred signal charges, thereby settling the signal level. In this operation, the signal charges are transferred from the set of the pixels 12b and 12b' to the gate of the signal transfer unit 13b. A variation of the electric potential from the reset level corresponds to two pixels. That is, the variation is obtained by adding signals from two pixels. The same goes for the signal transfer unit 13d, 13f, or 13h.

At a time t25 when the transfer operation adequately ends, the control signals PTX(n+1), PTX(n+3), PTX(n+5), and PTX(n+7) are negated. Then, at a time t26, PTS is activated. This turns on the transfer gates 18b, 18a, 18d, and 18c connected to the outputs of the column amplifiers 17b, 17a, 17d, and 17c connected to the vertical output lines 15b, 15a, 15d, and 15c, respectively. The holding capacitors 20b, 20a, 20d, and 20c hold signal levels, respectively. After that, when PTS is negated at a time t27, the transfer operation is completed.

With the above operations, the holding capacitor 20b holds the added signal level of the set of the pixels 12b and 12b', and the holding capacitor 20a holds the added signal level of the set of the pixels 12d and 12d'. Similarly, the holding capacitor 20d holds the added signal level of the set of the pixels 12f and 12f', and the holding capacitor 20c holds the added signal level of the set of the pixels 12h and 12h'. The holding capacitors 21b, 21a, 21d, and 21c hold the dark levels of the sets of the pixels 12b and 12b', 12d and 12d', 12f and 12f', and 12h and 12h', respectively.

Since the signal output operation from the pixels is complete, the row selection control signals PSEL(n+2) and PSEL(n+6) are negated at a time t28.

At a time t29, the control signals PADDS and PADDN are activated, thereby turning on the switches 28a, 28b, 28c, and 28d. With this operation, the holding capacitors 20a and 20b, 21a and 21b, 20c and 20d, and 21c and 21d are respectively short-circuited. The holding capacitor 20a holds a signal obtained by averaging the added signal of the set of the pixels 12b and 12b' and that of the set of the pixels 12d and 12d'. The holding capacitor 20c holds a signal obtained by averaging the added signal of the set of the pixels 12f and 12f' and that of the set of the pixels 12h and 12h'. The holding capacitor 21a holds an average of the dark levels of the sets of the pixels 12b and 12b', and 12d and 12d'. The holding capacitor 21c holds an average of the dark levels of the sets of the pixels 12f and 12f', and 12h and 12h'. At a time t30, the control signals PADDS and PADDN are negated, and then the averaging operation is completed.

The horizontal scan circuits 27a and 27b control the transfer switches 22a, 23a, 22c, and 23c to perform an operation of connecting the holding capacitors 20a, 21a, 20c, and 21c to the horizontal output lines. When the control signal PH1 is turned on at a time t31, the horizontal output line 24a is connected with the holding capacitor 20a via the transfer switch 22a, and the horizontal output line 24b is connected with the holding capacitor 21a via the transfer switch 23a. That is, at this time, an average of the dark levels of the set of the pixels 12b, 12b', 12d, and 12d', and an average signal level of the sets of the pixels 12b and 12b', and 12d and 12d' are input to the readout amplifier 25a, which outputs a signal obtained by multiplying the difference between the input data with the predetermined gain.

Similarly, the horizontal output line 24c is connected with the holding capacitor 20c via the transfer switch 22c, and the horizontal output line 24d is connected with the holding capacitor 21c via the transfer switch 23c. That is, at this time, an average of the dark levels of the set of the pixels 12f, 12f', 12h, and 12h', and an average signal level of the sets of the pixels 12f and 12f', and 12h and 12h' are input to the readout amplifier 25b, which outputs a signal obtained by multiplying the difference between the input data with the predetermined gain.

With the above operations, output of the pixel signals in the (n+1)th, (n+3)th, (n+5)th, and (n+7)th rows is completed. Note that although only two columns are described in this embodiment, the above-mentioned operations are sequentially repeated up to the last column by using the two columns as a unit.

FIG. 3 shows an example in which the above-described operations are applied to an image sensor having green, red, and blue color filters with a Bayer arrangement on pixels. FIG. 3 shows that pixels assigned with the same symbol (such as G11) have been averaged, and an averaging operation is performed every four pixels for each of green (G), red (R), or blue (B) in the vertical direction.

As described above, the arrangement explained in this embodiment makes it possible to average four pixels for every four pixels with respect to each of the first and second pixels alternately arranged in the vertical direction. This decreases the number of rows to be read out while reflecting the information of all the pixel signals on an image, thereby improving the image quality.

Second Embodiment

Figure 4:
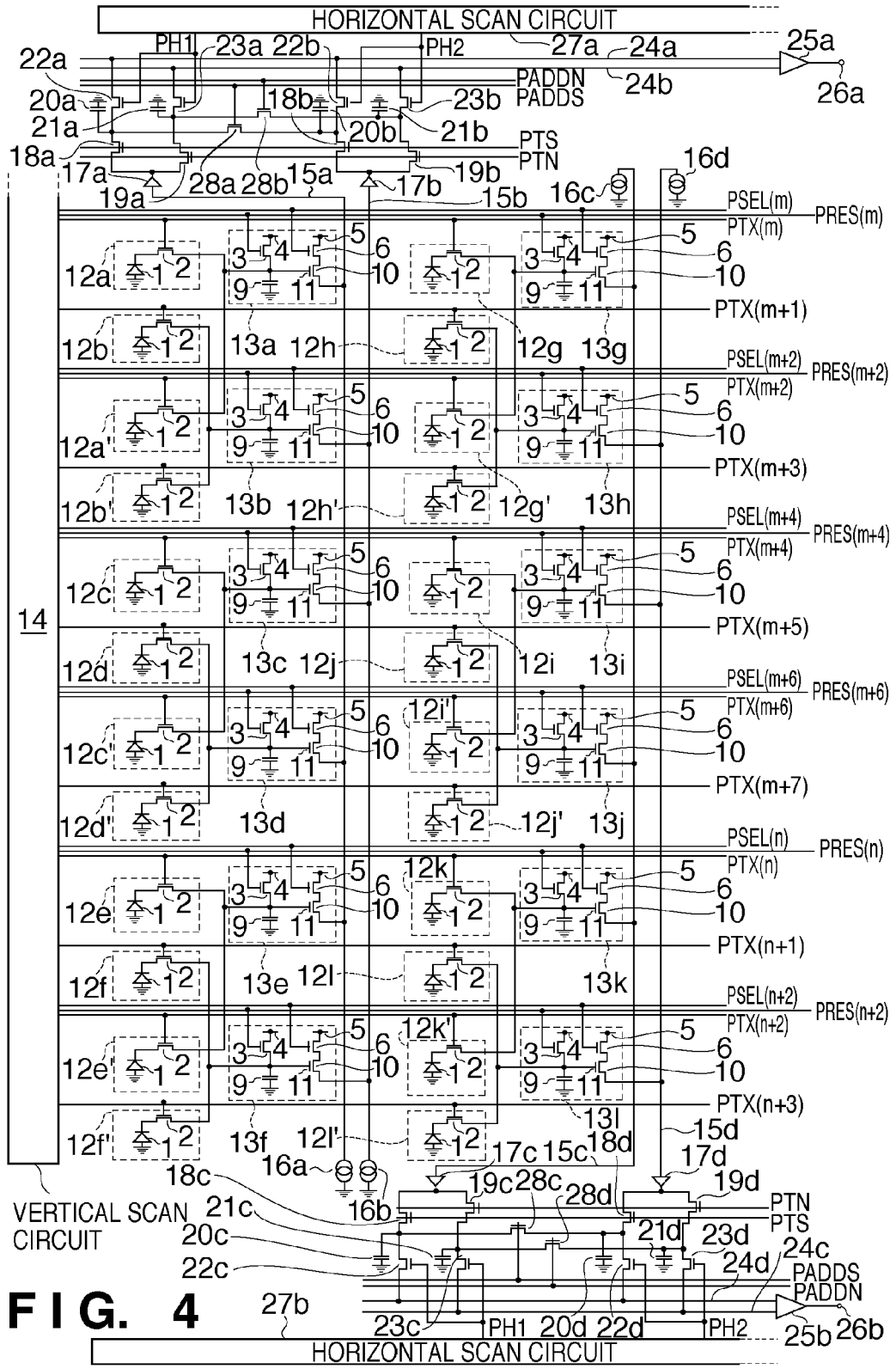
FIG. 4 is a circuit diagram showing the arrangement of an image sensor according to the second embodiment of the present invention.

FIG. 4 is a circuit diagram showing the arrangement of an image sensor according to the second embodiment of the present invention. In FIG. 4, the arrangement is the same as that described in the first embodiment except for a pixel arrangement and connection of signal transfer units with vertical output lines, and a description thereof will be omitted.

Referring to FIG. 4, the vertical direction of the effective pixel region of the image sensor is formed by a set of pixels 12a, 12a', 12b, 12b', 12c, 12c', 12d, 12d', 12e, 12e', 12f, and 12f'. A set of the pixels 12a, 12b, 12a', and 12b' are arranged in the vertical direction in the order named. Below them, a set of the pixels 12c, 12d, 12c', and 12d' are arranged in the vertical direction in the order named. Successively, the pixels 12e, 12f, 12e', and 12f' are arranged in the vertical direction in the order named. Sets of the pixels 12a and 12a', 12b and 12b', 12c and 12c', 12d and 12d', 12e and 12e', and 12f and 12f' are connected to signal transfer units 13a, 13b, 13c, 13d, 13e, and 13f, respectively.

Of the set of the pixels 12a and 12a', the gate of a transfer switch 2 of the pixel 12a is connected to a control signal PTX(m) from a vertical scan circuit 14. The gate of a transfer switch 2 of the pixel 12a' is connected to a control signal PTX(m+2) from the vertical scan circuit 14. Furthermore, the gate of a transfer switch 2 of the pixel 12b is connected to a control signal PTX(m+1) from the vertical scan circuit 14. The gate of a transfer switch 2 of the pixel 12b' is connected to a control signal PTX(m+3) from the vertical scan circuit 14.

The same goes for a set of the pixels 12c, 12c', 12d, 12d', 12e, 12e', 12f, and 12f'. That is, the gates of transfer switches 2 of the set of the pixels 12c and 12c' are connected to control signals PTX(m+4) and PTX(m+6), respectively. The gates of transfer switches 2 of the set of the pixels 12d and 12d' are connected to control signals PTX(m+5) and PTX(m+7), respectively. The gates of transfer switches 2 of the set of the pixels 12e and 12e' are respectively connected to control signals PTX(n) and PTX(n+2) as part of a vertical repetition of the control signals PTX(m) to PTX(m+7). The gates of transfer switches 2 of the set of the pixels 12f and 12f' are connected to control signals PTX(n+1) and PTX(n+3), respectively.

The gate of a reset switch 3 of the signal transfer unit 13a is connected to a control signal PRES(m) from the vertical scan circuit 14, and the gate of a row selection switch 6 is connected to a control signal PSEL(m) from the vertical scan circuit 14. The gate of a reset switch 3 of the signal transfer unit 13b is connected to a control signal PRES(m+2) from the vertical scan circuit 14, and the gate of a row selection switch 6 is connected to a control signal PSEL(m+2) from the vertical scan circuit 14. Similarly, the gates of reset switches 3 of the signal transfer units 13c and 13d are connected to control signals PRES(m+4) and PRES(m+6), respectively. The gates of row selection switches 6 are connected to control signals PSEL(m+4) and PSEL(m+6), respectively. The gates of reset switches 3 of the signal transfer units 13e and 13f are respectively connected to control signals PRES(n) and PRES(n+2) as part of a vertical repetition of control signals PRES(m) to PRES(m+7). The gates of row selection switches 6 are respectively connected to control signals PSEL(n) and PSEL(n+2) as part of a vertical repetition of control signals PSEL(m) to PSEL(m+7).

The signal transfer units 13a and 13d are respectively connected to a vertical output line 15a running through the image sensor. The signal transfer units 13b and 13c are respectively connected to a vertical output line 15b. With such arrangement, connection of the signal transfer units 13a and 13b with the two vertical output lines 15a and 15b is symmetrical to connection of the signal transfer units 13c and 13d with the vertical output lines 15a and 15b with respect to the boundary between the signal transfer units 13b and 13c. The set of the pixels 12e, 12e', 12f, and 12f' or the signal transfer units 13e and 13f are part of a vertical repetition of the pixels 12a to 12d' or signal transfer units 13a to 13d. Connection of the signal transfer units 13e and 13f with the vertical output lines 15a and 15b is the same as that of the signal transfer units 13a and 13b with the vertical output lines 15a and 15b. Similarly, a set of pixels 12g, 12g', 12h, 12h', 12i, 12i', 12j, 12j', 12k, 12k', 12l, and 12l' adjacent to the column in which the set of the pixels 12a, 12a', 12b, 12b', 12c, 12c', 12d, 12d', 12e, 12e', 12f, and 12f' are arranged have the following arrangement.

The vertical direction of the effective pixel region of the image sensor is formed by the set of the pixels 12g, 12g', 12h, 12h', 12i, 12i', 12j, 12j', 12k, 12k', 12l, and 12l'. A set of the pixels 12g, 12h, 12g', and 12h' are arranged in the vertical direction in the order named. Below them, a set of the pixels 12i, 12j, 12i', and 12j' are arranged in the vertical direction in the order named. Successively, the pixels 12k, 12l, 12k', and 12l' are arranged in the vertical direction in the order named. Sets of the pixels 12g and 12g', 12h and 12h', 12i and 12i', 12j and 12j', 12k and 12k', and 12l and 12l' are connected to signal transfer units 13g, 13h, 13i, 13j, 13k, and 13l, respectively.

Of the set of the pixels 12g and 12g', the gate of a transfer switch 2 of the pixel 12g is connected to the control signal PTX(m) from the vertical scan circuit 14. The gate of a transfer switch 2 of the pixel 12g' is connected to the control signal PTX(m+2) from the vertical scan circuit 14. Furthermore, the gate of a transfer switch 2 of the pixel 12h is connected to the control signal PTX(m+1) from the vertical scan circuit 14. The gate of a transfer switch 2 of the pixel 12h' is connected to the control signal PTX(m+3) from the vertical scan circuit 14.

The same goes for a set of the pixels 12i, 12i', 12j, 12j', 12k, 12k', 12l, and 12l'. That is, the gates of transfer switches 2 of the set of the pixels 12i and 12i' are connected to the control signals PTX(m+4) and PTX(m+6), respectively. The gates of transfer switches 2 of the set of the pixels 12j and 12j' are connected to the control signals PTX(m+5) and PTX(m+7), respectively. The gates of transfer switches 2 of the set of the pixels 12k and 12k' are respectively connected to the control signals PTX(n) and PTX(n+2) as part of a vertical repetition of the control signals PTX(m) to PTX(m+7). The gates of transfer switches 2 of the set of the pixels 12l and 12l' are connected to the control signals PTX(n+1) and PTX(n+3), respectively.

The gate of a reset switch 3 of the signal transfer unit 13g is connected to the control signal PRES(m) from the vertical scan circuit 14, and the gate of a row selection switch 6 is connected to the control signal PSEL(m) from the vertical scan circuit 14. The gate of a reset switch 3 of the signal transfer unit 13h is connected to the control signal PRES(m+2) from the vertical scan circuit 14, and the gate of a row selection switch 6 is connected to the control signal PSEL(m+2) from the vertical scan circuit 14. Similarly, the gates of reset switches 3 of the signal transfer units 13i and 13j are connected to the control signals PRES(m+4) and PRES(m+6), respectively. The gates of row selection switches 6 are connected to the control signals PSEL(m+4) and PSEL(m+6), respectively. The gates of reset switches 3 of the signal transfer units 13k and 13l are respectively connected to the control signals PRES(n) and PRES(n+2) as part of a vertical repetition of the control signals PRES(m) to PRES(m+7). The gates of row selection switches 6 are respectively connected to the control signals PSEL(n) and PSEL(n+2) as part of a vertical repetition of the control signals PSEL(m) to PSEL (m+7).

The signal transfer units 13g and 13j are respectively connected to a vertical output line 15c running through the image sensor. The signal transfer units 13h and 13i are respectively connected to a vertical output line 15d. With such arrangement, connection of the signal transfer units 13g and 13h with the two vertical output lines 15c and 15d is symmetrical to connection of the signal transfer units 13i and 13j with the vertical output lines 15c and 15d with respect to the boundary between the signal transfer units 13h and 13i. The set of the pixels 12k, 12k', 12l, and 12l' or the signal transfer units 13k and 13l are part of a vertical repetition of the pixels 12g to 12j' or the signal transfer units 13g to 13j. Connection of the signal transfer units 13k and 13l with the vertical output lines 15c and 15d is the same as that of the signal transfer units 13g and 13h with the vertical output lines 15c and 15d.

Figure 5:
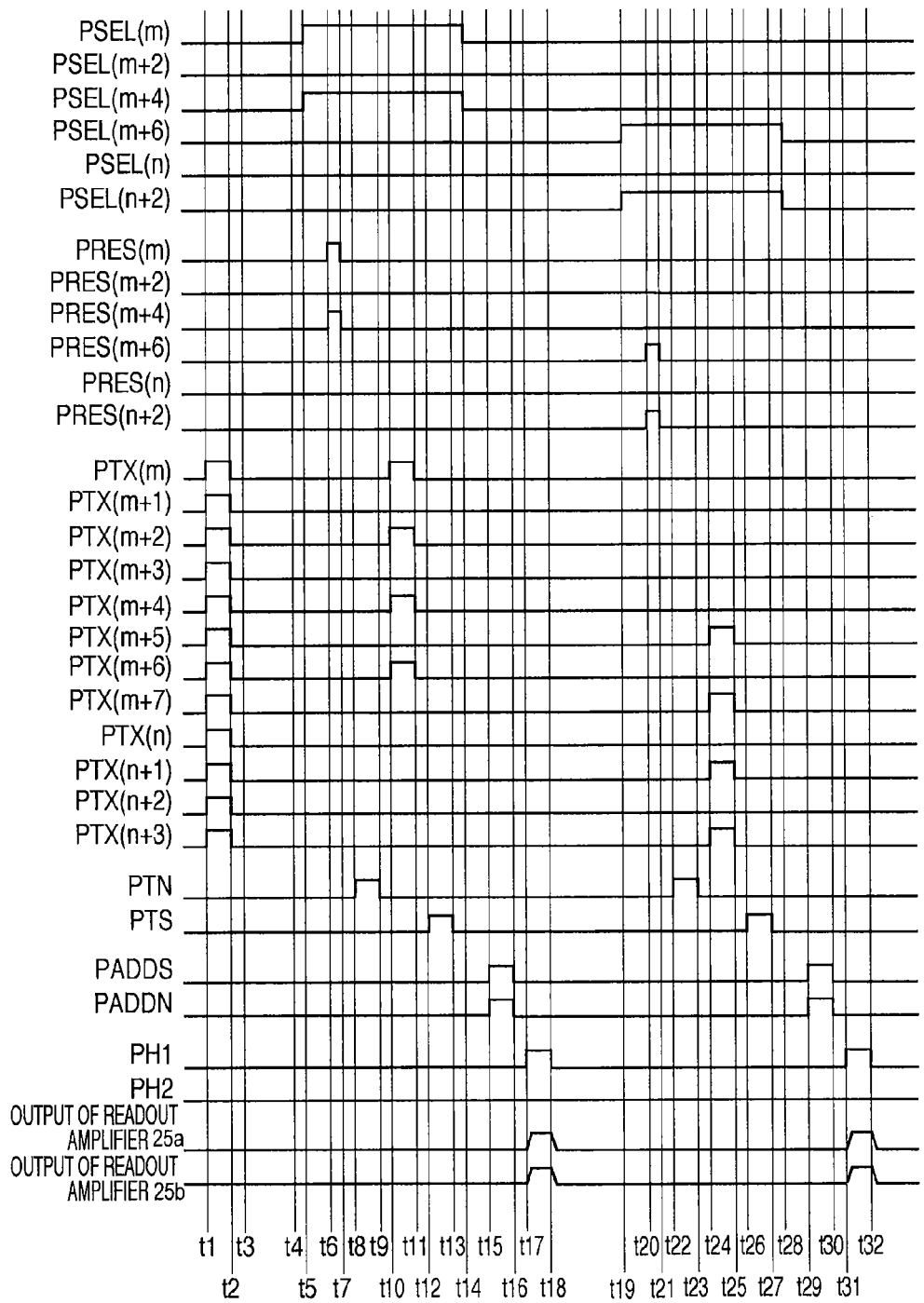
FIG. 5 is a timing chart showing the operation of the image sensor according to the second embodiment of the present invention.

FIG. 5 is a timing chart showing the operation timings of the image sensor in FIG. 4. The operation of each unit will be explained with reference to FIG. 5.

During a reset period for all pixels from t1 to t2, the control signals PTX(m), PTX(m+1), PTX(m+2), PTX(m+3), PTX(m+4), PTX(m+5), PTX(m+6), PTX(m+7), PTX(n), PTX(n+1), PTX(n+2), and PTX(n+3) are activated. Only control signals for specific rows are shown. However, control signals PTXes for all rows are activated during the period. The electrical charges of the photodiodes 1 of all the pixels are transferred to gates 11 of pixel amplifiers 10 via the transfer switches 2, respectively, to reset the photodiodes 1.

At a time t3, all the pixels simultaneously start accumulation. At a time t4, a mechanism (not shown) outside the image sensor blocks light entering the image sensor. A period from t3 to t4 is an accumulation period, in which each photodiode 1 accumulates signal charges. Note that although all the pixels simultaneously start accumulation in this example, the present invention is not limited to this. The photodiodes 1 may be reset for each row.

An operation of reading out the accumulated signal charges starts next. At a time t5, the control signals PSEL(m) and PSEL(m+4) are activated, thereby turning on the row selection switches 6. A source follower circuit which includes the pixel amplifiers 10 of the signal transfer units 13a and 13g arranged in the mth row and the signal transfer units 13c and 13i arranged in the (m+4)th row, and the current sources 16a, 16b, 16c, and 16d connected to the vertical output lines enters an operation state.

At a time t6, the control signals PRES(m) and PRES(m+4) are activated, thereby turning on the reset switches 3. The gates 11 of the pixel amplifiers 10, that is, capacitors 9, in the signal transfer units 13a, 13c, 13g, and 13i are initialized. That is, signals at signal levels (so-called dark levels) immediately after the reset operation are output to the vertical output lines 15a, 15b, 15c, and 15d, respectively.

At a time t7, the control signals PRES(m) and PRES(m+4) are negated. Then, at a time t8, PTN is activated. This turns on transfer gates 19a, 19b, 19c, and 19d connected to the outputs of column amplifiers 17a, 17b, 17c, and 17d connected to the vertical output lines 15a, 15b, 15c, and 15d, respectively. Holding capacitors 21a, 21b, 21c, and 21d hold the dark-level outputs. After the transfer operation is completed at a time t9, the control signals PTX(m), PTX(m+2), PTX(m+4), and PTX(m+6) are activated at a time t10, thereby turning on the transfer switches 2 of the set of the pixels 12a, 12a', 12c, 12c', 12g, 12g', 12i, and 12i'. The signal charges accumulated in the corresponding photodiode 1 are transferred to the gate 11 of a source follower formed by the pixel amplifier 10 of each of the signal transfer units 13a, 13c, 13g, and 13i. At this time, in the gate 11 of the source follower formed by the pixel amplifier 10, the electric potential varies from a reset level by an amount corresponding to the transferred signal charges, thereby settling the signal level.

In this operation, the signal charges are transferred from the set of the pixels 12a and 12a' to the gate of the signal transfer unit 13a. A variation of the electric potential from the reset level corresponds to two pixels. That is, the variation is obtained by adding signals from two pixels. The same goes for the signal transfer unit 13c, 13g, or 13i.

At a time t11 when the transfer operation adequately ends, the control signals PTX(m), PTX(m+2), PTX(m+4), and PTX(m+6) are negated. Then, at a time t12, PTS is activated. This turns on transfer gates 18a, 18b, 18c, and 18d connected to the outputs of the column amplifiers 17a, 17b, 17c, and 17d connected to the vertical output lines 15a, 15b, 15c, and 15d, respectively. Holding capacitors 20a, 20b, 20c, and 20d hold signal levels, respectively. After that, when PTS is negated at a time t13, the transfer operation is completed.

With the above operations, the holding capacitor 20a holds the added signal level of the set of the pixels 12a and 12a', and the holding capacitor 20b holds the added signal level of the set of the pixels 12c and 12c'. Similarly, the holding capacitor 20c holds the added signal level of the set of the pixels 12g and 12g', and the holding capacitor 20d holds the added signal level of the set of the pixels 12i and 12i'. The holding capacitors 21a, 21b, 21c, and 21d hold the dark levels of the sets of the pixels 12a and 12a', 12c and 12c', 12g and 12g', and 12i and 12i', respectively.

Since the signal output operation from the pixels is complete, the row selection control signals PSEL(m) and PSEL(m+4) are negated at a time t14.

At a time t15, control signals PADDS and PADDN are activated, thereby turning on switches 28a, 28b, 28c, and 28d. With this operation, the holding capacitors 20a and 20b, 21a and 21b, 20c and 20d, and 21c and 21d are respectively short-circuited. The holding capacitor 20a holds a signal obtained by averaging the added signal of the set of the pixels 12a and 12a' and that of the set of the pixels 12c and 12c'. The holding capacitor 20c holds a signal obtained by averaging the added signal of the set of the pixels 12g and 12g' and that of the set of the pixels 12i and 12i'.

Furthermore, the holding capacitor 21a holds an average of the dark levels of the sets of the pixels 12a and 12a', and 12c and 12c'. The holding capacitor 21c holds an average of the dark levels of the sets of the pixels 12g and 12g', and 12i and 12i'. At a time t16, PADDS and PADDN are negated, and then the averaging operation is completed.

Horizontal scan circuits 27a and 27b control transfer switches 22a, 23a, 22c, and 23c to perform an operation of connecting the holding capacitors 20a, 21a, 20c, and 21c to horizontal output lines. When a control signal PH1 is turned on at a time t17, a horizontal output line 24a is connected with the holding capacitor 20a via the transfer switch 22a, and a horizontal output line 24b is connected with the holding capacitor 21a via the transfer switch 23a. That is, at this time, an average of the dark levels of the set of the pixels 12a, 12a', 12c, and 12c', and an average signal level of the sets of the pixels 12a and 12a', and 12c and 12c' are input to a readout amplifier 25a, which outputs a signal obtained by multiplying the difference between the input data with a predetermined gain.

Similarly, a horizontal output line 24c is connected with the holding capacitor 20c via the transfer switch 22c, and a horizontal output line 24d is connected with the holding capacitor 21c via the transfer switch 23c. That is, at this time, an average of the dark levels of the set of the pixels 12g, 12g', 12i, and 12i', and an average signal level of the sets of the pixels 12g and 12g', and 12i and 12i' are input to a readout amplifier 25b, which outputs a signal obtained by multiplying the difference between the input data with a predetermined gain.

With the above operations, output of the pixel signals in the mth, (m+2)th, (m+4)th, and (m+6)th rows is completed. Note that although only two columns are described in this embodiment, the above-mentioned operations are sequentially repeated up to the last column by using the two columns as a unit.

Next, an operation of reading out the (m+5)th, (m+7)th, (n+1)th, and (n+3)th rows will be explained. At a time t19, the control signals PSEL(m+6) and PSEL(n+2) are activated, thereby turning on the row selection switches 6. A source follower circuit which includes the pixel amplifiers 10 of the signal transfer units 13d and 13j arranged in the (m+6)th row and the signal transfer units 13f and 13l arranged in the (n+2)th row, and the current sources 16a, 16b, 16c, and 16d connected to the vertical output lines enters an operation state.

At a time t20, the control signals PRES(m+6) and PRES(n+2) are activated, thereby turning on the reset switches 3. The gates 11 of the pixel amplifiers 10, that is, capacitors 9, in the signal transfer units 13d, 13f, 13j, and 13l are initialized. That is, signals at signal levels (so-called dark levels) immediately after the reset operation are output to the vertical output lines 15a, 15b, 15c, and 15d, respectively.

At a time t21, the control signals PRES(m+6) and PRES(n+2) are negated. Then, at a time t22, PTN is activated. This turns on the transfer gates 19a, 19b, 19c, and 19d connected to the outputs of the column amplifiers 17a, 17b, 17c, and 17d connected to the vertical output lines 15a, 15b, 15c, and 15d, respectively. The holding capacitors 21a, 21b, 21c, and 21d hold the dark-level outputs, respectively. After the transfer operation is completed at a time t23, the control signals PTX(m+5), PTX(m+7), PTX(n+1), and PTX(n+3) are activated at a time t24, thereby turning on the transfer switches 2 of the set of the pixels 12d, 12d', 12f, 12f', 12j, 12j', 12l, and 12l'. The signal charges accumulated in the corresponding photodiode 1 are transferred to the gate 11 of a source follower formed by the pixel amplifier 10 of each of the signal transfer units 13d, 13f, 13j, and 13l. At this time, in the gate 11 of the source follower formed by the pixel amplifier 10, the electric potential varies from a reset level by an amount corresponding to the transferred signal charges, thereby settling the signal level.

In this operation, the signal charges are transferred from the set of the pixels 12d and 12d' to the gate of the signal transfer unit 13d. A variation of the electric potential from the reset level corresponds to the two pixels. That is, the variation is obtained by adding signals from the two pixels. The same goes for the signal transfer unit 13f, 13j, or 13l.

At a time t25 when the transfer operation adequately ends, the control signals PTX(m+5), PTX(m+7), PTX(n+1), and PTX(n+3) are negated. Then, at a time t26, PTS is activated. This turns on the transfer gates 18a, 18b, 18c, and 18d connected to the outputs of the column amplifiers 17a, 17b, 17c, and 17d connected to the vertical output lines 15a, 15b, 15c, and 15d, respectively. The holding capacitors 20a, 20b, 20c, and 20d hold signal levels, respectively. After that, when PTS is negated at a time t27, the transfer operation is completed.

With the above operations, the holding capacitor 20a holds the added signal level of the set of the pixels 12d and 12d', and the holding capacitor 20b holds the added signal level of the set of the pixels 12f and 12f'. Similarly, the holding capacitor 20c holds the added signal level of the set of the pixels 12j and 12j', and the holding capacitor 20d holds the added signal level of the set of the pixels 12l and 12l'. The holding capacitors 21a, 21b, 21c, and 21d hold the dark levels of the sets of the pixels 12d and 12d', 12f and 12f', 12j and 12j', and 12l and 12l', respectively.

Since the signal output operation from the pixels is complete, the row selection control signals PSEL(m+6) and PSEL(n+2) are negated at a time t28.

At a time t29, the control signals PADDS and PADDN are activated, thereby turning on the switches 28a, 28b, 28c, and 28d. With this operation, the holding capacitors 20a and 20b, 21a and 21b, 20c and 20d, and 21c and 21d are respectively short-circuited. The holding capacitor 20a holds a signal obtained by averaging the added signal of the set of the pixels 12d and 12d' and that of the set of the pixels 12f and 12f'. The holding capacitor 20c holds a signal obtained by averaging the added signal of the set of the pixels 12j and 12j' and that of the set of the pixels 12l and 12l'. The holding capacitor 21a holds an average of the dark levels of the sets of the pixels 12d and 12d', and 12f and 12f'. The holding capacitor 21c holds an average of the dark levels of the sets of the pixels 12j and 12j', and 12l and 12l'. At a time t30, PADDS and PADDN are negated, and then the averaging operation is completed.

The horizontal scan circuits 27a and 27b control the transfer switches 22a, 23a, 22c, and 23c to perform an operation of connecting the holding capacitors 20a, 21a, 20c, and 21c to the horizontal output lines. When the control signal PH1 is turned on at a time t31, the horizontal output line 24a is connected with the holding capacitor 20a via the transfer switch 22a, and the horizontal output line 24b is connected with the holding capacitor 21a via the transfer switch 23a. That is, at this time, an average of the dark levels of the set of the pixels 12d, 12d', 12f, and 12f', and an average signal level of the sets of the pixels 12d and 12d', and 12f and 12f' are input to the readout amplifier 25a, which outputs a signal obtained by multiplying the difference between the input data with the predetermined gain.

Similarly, the horizontal output line 24c is connected with the holding capacitor 20c via the transfer switch 22c, and the horizontal output line 24d is connected with the holding capacitor 21c via the transfer switch 23c. That is, at this time, an average of the dark levels of the set of the pixels 12j, 12j', 12l, and 12l', and an average signal level of the sets of the pixels 12j and 12j', and 12l and 12l' are input to the readout amplifier 25b, which outputs a signal obtained by multiplying the difference between the input data with the predetermined gain.

With the above operations, output of the pixel signals in the (m+5)th, (m+7)th, (n+1)th, and (n+3)th rows is completed. Note that although only two columns are described in this embodiment, the above-mentioned operations are sequentially repeated up to the last column by using the two columns as a unit.

FIG. 6 shows an example in which the above-described operations are applied to an image sensor having green, red, and blue color filters with a Bayer arrangement on pixels. FIG. 6 shows that pixels assigned with the same symbol (such as G11) have been averaged, and that an averaging operation is performed every four pixels for each of green (G), red (R), or blue (B) in the vertical direction and the signals of hatched pixels are not read out.

As described above, the arrangement explained in this embodiment makes it possible to average four pixels for every six pixels with respect to each of the first and second pixels alternately arranged in the vertical direction. This decreases the number of rows to be read out while reflecting the information of a larger number of pixel signals on an image, thereby improving the image quality.

Third Embodiment

Figure 7:
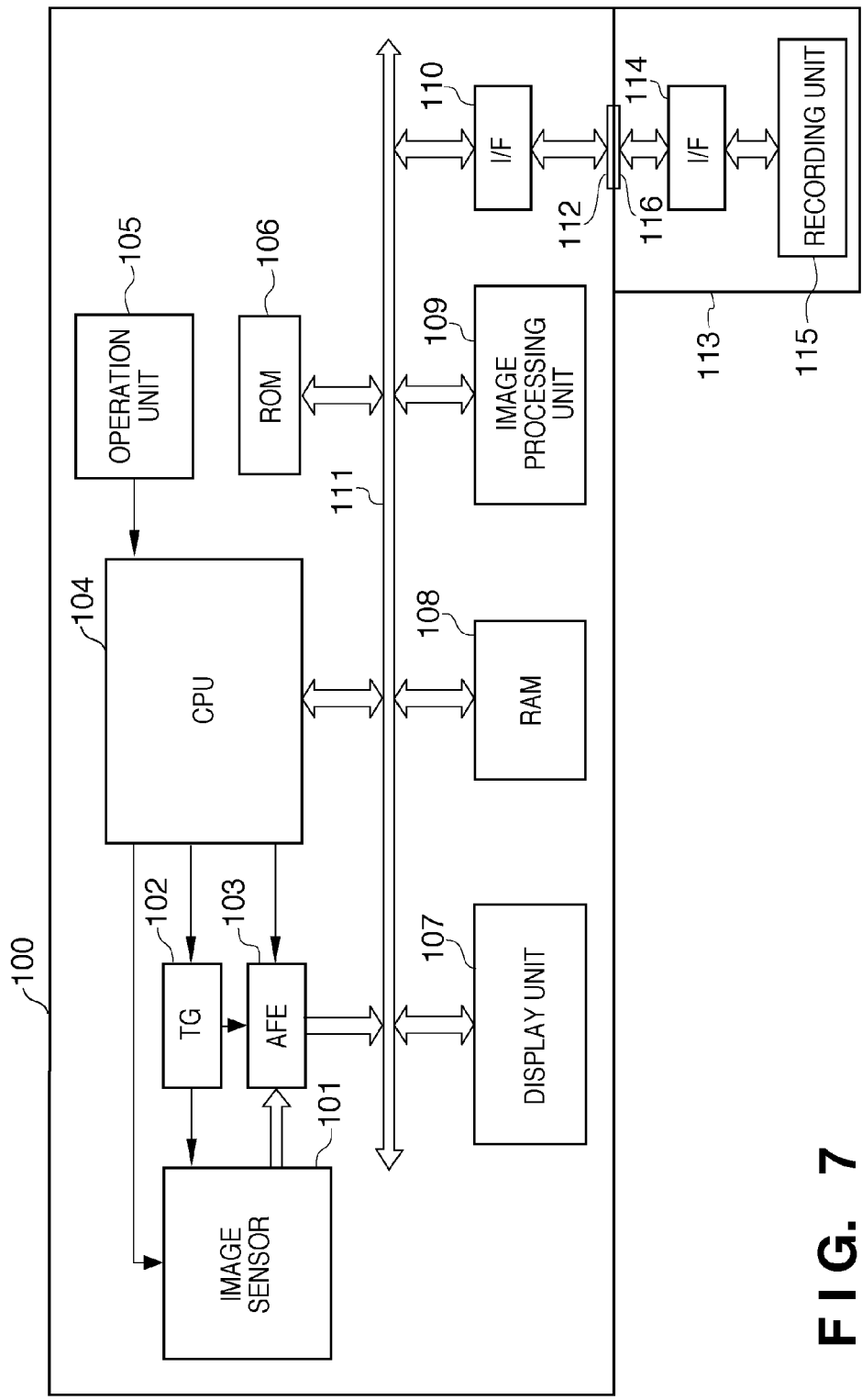
FIG. 7 is a block diagram showing the arrangement of an image capture apparatus according to the third embodiment of the present invention.

The third embodiment of the present invention will be described below. FIG. 7 is a block diagram showing the arrangement of an image capture apparatus having the image sensor shown in the first and second embodiments.

In an image capture apparatus 100 of FIG. 7, reference numeral 101 denotes an image sensor shown in the first and second embodiments; 103, an analog front end (to be referred to as an AFE hereinafter) which performs gain adjustment and digital conversion in correspondence with predetermined quantization bits for an analog image signal output from the image sensor 101; and 102, a timing generator (to be referred to as a TG hereinafter) which controls the driving timing of the image sensor 101 and AFE 103.

Reference numeral 108 denotes a RAM which has a function of an image data storage means for storing image data having undergone digital conversion in the AFE 103 and image data having processed by an image processing unit 109 (to be described later), and a function of a work memory used when a CPU 104 (to be described later) operates. In this embodiment, these functions are executed using the RAM 108. Another memory, however, is also applicable as long as the memory has an adequate access speed level which imposes no problem.

Reference numeral 106 denotes a ROM storing a program used when the CPU 104 (to be described later) operates. Although a Flash ROM is used in this embodiment, this is merely an example. Another memory is also applicable as long as the memory has an adequate access speed level which imposes no problem. The CPU 104 collectively controls the image capture apparatus 100. The image processing unit 109 executes processes such as correction and compression processes for captured images.

Reference numeral 110 denotes an interface unit with an external recording medium, for recording still image data and moving image data in the external recording medium; 112, a connector with an external recording medium; 113, an external recording medium such as a non-volatile memory or hard disk; 116, a connector with the image capture apparatus 100; 114, an interface with the image capture apparatus 100; and 115, an internal recording unit such as a non-volatile memory or hard disk. Note that although a detachable external recording medium is used as a recording medium in this embodiment, a non-volatile memory or hard disk in which data are writable may be incorporated.

Figure 8:
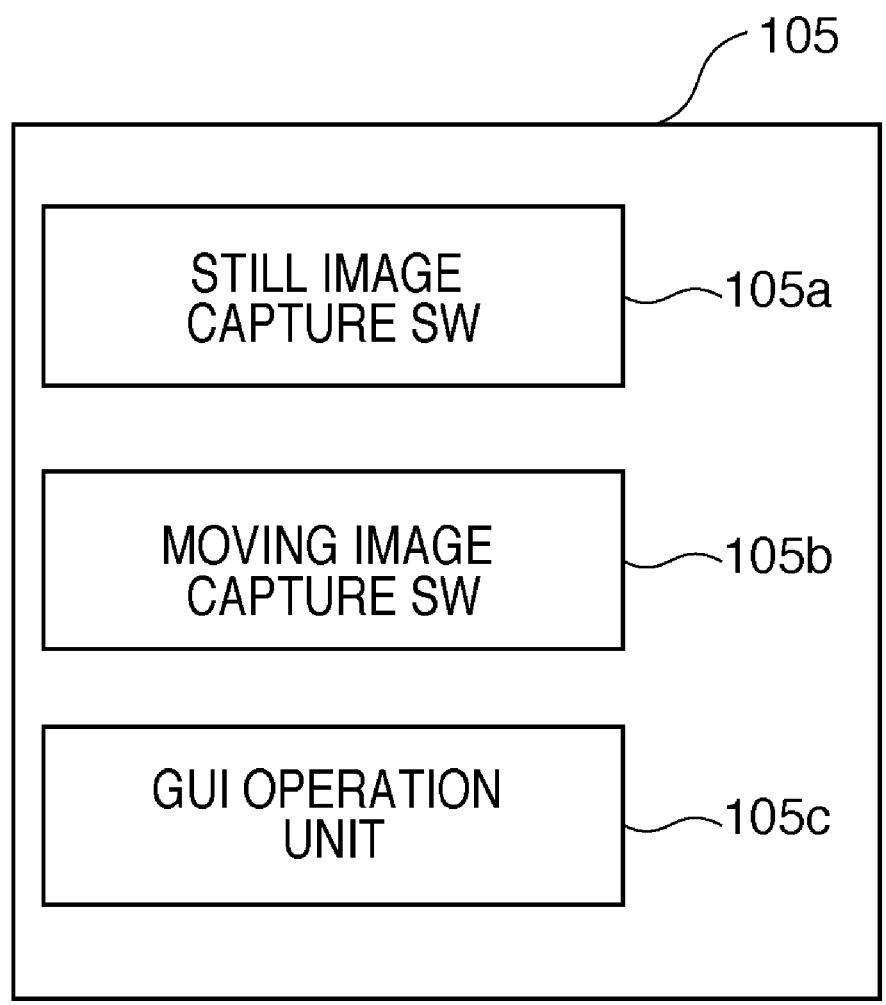
FIG. 8 is a block diagram showing the arrangement of an operation unit of the image capture apparatus according to the third embodiment of the present invention.

Reference numeral 105 denotes an operation unit which sets image capture instructions, image capture conditions, and the like in the CPU 104. As shown in FIG. 8, the operation unit 105 includes a still image capture switch 105a, a moving image capture switch 105b, and a GUI operation unit 105c which operates a menu displayed on a display unit, and the like. Reference numeral 107 denotes a display unit which displays a captured still image or moving image, a menu, or the like.

The image capture apparatus 100 of this embodiment has a plurality of image capture modes. An operation in each image capture mode will be explained below.

Figure 9:
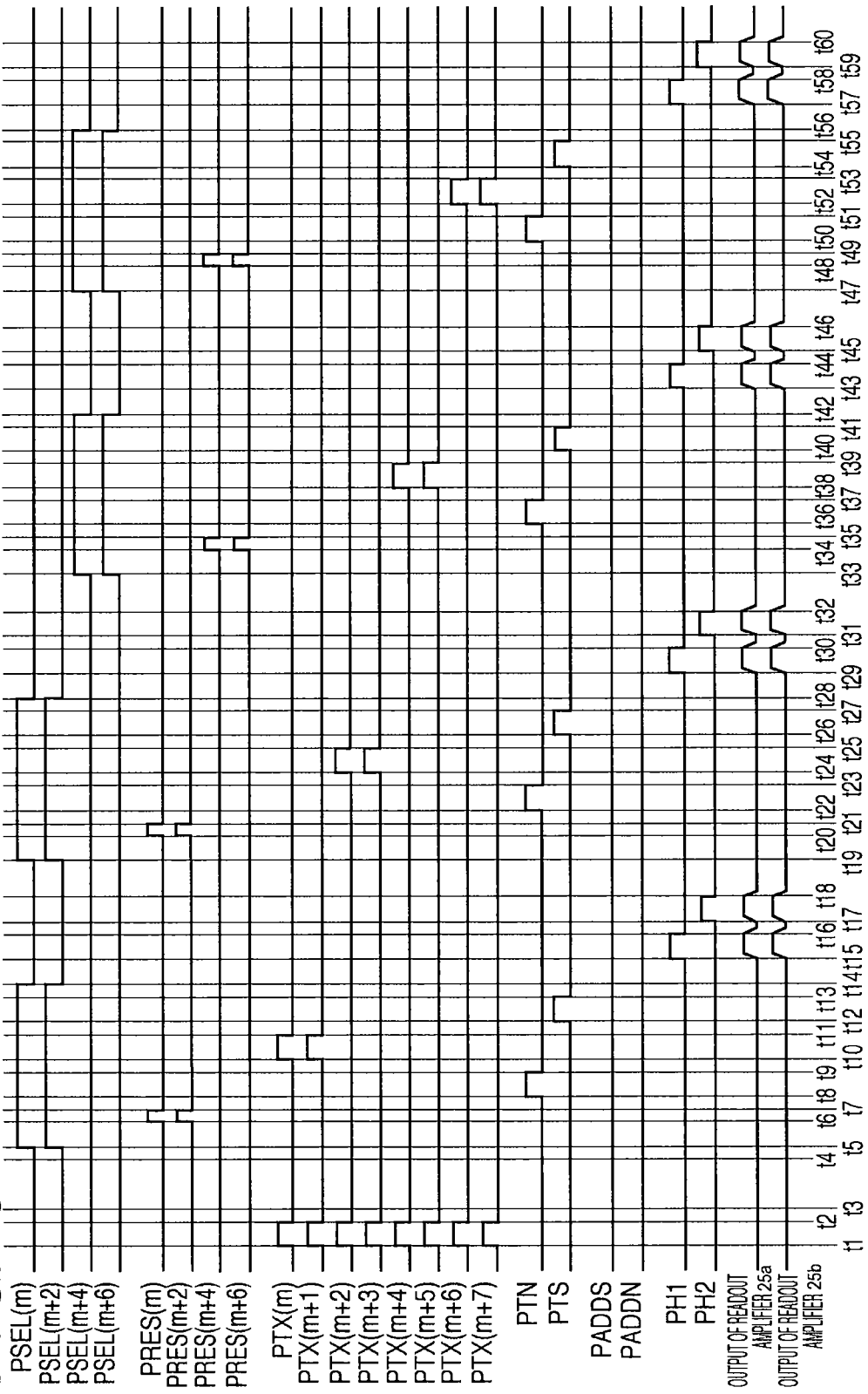
FIG. 9 is a timing chart showing the operation of an image sensor according to the third embodiment of the present invention.

A still image capture mode will be described below. When the user presses the still image capture switch 105a, the CPU 104 sends settings for capturing a still image to the image sensor 101 and TG 102. After that, a start signal is output to the TG 102, and the image sensor 101 starts an image capture operation based on a driving signal from the TG 102. The image capture operation will be explained below using FIG. 9. Note that signals in FIG. 9 correspond to those shown in FIG. 4.

During a reset period for all pixels from t1 to t2, control signals PTX(m), PTX(m+1), PTX(m+2), PTX(m+3), PTX(m+4), PTX(m+5), PTX(m+6), and PTX(m+7) are activated. Only control signals for specific rows are shown. However, control signals PTXes for all rows are activated during the period. The electrical charges of photodiodes 1 of all the pixels are transferred to gates 11 of pixel amplifiers 10 via transfer switches 2, respectively, to reset the photodiodes 1.

At a time t3, all the pixels simultaneously start accumulation. At a time t4, a shutter (not shown) blocks light entering the image sensor. A period from t3 to t4 is an accumulation period, in which each photodiode 1 accumulates signal charges.

An operation of reading out the accumulated signal charges starts next. At a time t5, control signals PSEL(m) and PSEL(m+2) are activated and row selection switches 6 are turned on. A source follower circuit which includes the pixel amplifiers 10 of signal transfer units 13a and 13g arranged in the mth row and signal transfer units 13b and 13h arranged in the (m+2)th row, and current sources 16a, 16b, 16c, and 16d connected to vertical output lines enters an operation state.

At a time t6, control signals PRES(m) and PRES(m+2) are activated, thereby turning on reset switches 3. The gates 11 of the pixel amplifiers 10, that is, capacitors 9, in the signal transfer units 13a, 13b, 13g, and 13h are initialized. That is, signals at signal levels (so-called dark levels) immediately after the reset operation are output to vertical output lines 15a, 15b, 15c, and 15d, respectively.

At a time t7, the control signals PRES(m) and PRES(m+2) are negated. Then, at a time t8, PTN is activated. This turns on transfer gates 19a, 19b, 19c, and 19d connected to the outputs of column amplifiers 17a, 17b, 17c, and 17d connected to the vertical output lines 15a, 15b, 15c, and 15d, respectively. Holding capacitors 21a, 21b, 21c, and 21d hold the dark-level outputs, respectively. After the transfer operation is completed at a time t9, the control signals PTX(m) and PTX(m+1) are activated at a time t10, thereby turning on the transfer switches 2 of the set of pixels 12a, 12b, 12g, and 12h. The signal charges accumulated in the corresponding photodiode 1 are transferred to the gate 11 of a source follower formed by the pixel amplifier 10 of each of the signal transfer units 13a, 13b, 13g, and 13h. At this time, in the gate 11 of the source follower formed by the pixel amplifier 10, the electric potential varies from a reset level by an amount corresponding to the transferred signal charges, thereby settling the signal level.

At a time t11 when the transfer operation adequately ends, the control signals PTX(m) and PTX(m+1) are negated. Then, at a time t12, PTS is activated. This turns on transfer gates 18a, 18b, 18c, and 18d connected to the outputs of the column amplifiers 17a, 17b, 17c, and 17d connected to the vertical output lines 15a, 15b, 15c, and 15d, respectively. Holding capacitors 20a, 20b, 20c, and 20d hold signal levels, respectively. After that, when PTS is negated at a time t13, the transfer operation is completed.

With the above operations, the holding capacitors 20a, 20b, 20c, and 20d hold the signal levels of the set of the pixels 12a, 12b, 12g, and 12h, respectively. The holding capacitors 21a, 21b, 21c, and 21d hold the dark levels of the set of the pixels 12a, 12b, 12g, and 12h, respectively.

Since the signal output operation from the pixels is complete, the row selection control signals PSEL(m) and PSEL(m+2) are negated at a time t14.

Horizontal scan circuits 27a and 27b control transfer switches 22a, 23a, 22b, 23b, 22c, 23c, 22d, and 23d to perform an operation of connecting the holding capacitors 20a, 21a, 20b, 21b, 20c, 21c, 20d, and 21d to horizontal output lines. When a control signal PH1 is turned on at a time t15, a horizontal output line 24a is connected with the holding capacitor 20a via the transfer switch 22a, and a horizontal output line 24b is connected with the holding capacitor 21a via the transfer switch 23a. That is, at this time, the dark level and signal level of the pixel 12a are input to a readout amplifier 25a, which outputs a signal obtained by multiplying the difference between the input data with a predetermined gain.

Similarly, a horizontal output line 24c is connected with the holding capacitor 20c via the transfer switch 22c, and a horizontal output line 24d is connected with the holding capacitor 21c via the transfer switch 23c. That is, at this time, the dark level and signal level of the pixel 12g are input to a readout amplifier 25b, which outputs a signal obtained by multiplying the difference between the input data with a predetermined gain. After that, the control signal PH1 is negated at a time t16, thereby terminating the output operation.

When a control signal PH2 is turned on at a time t17, the horizontal output line 24a is connected with the holding capacitor 20b via the transfer switch 22b, and the horizontal output line 24b is connected with the holding capacitor 21b via the transfer switch 23b. That is, at this time, the dark level and signal level of the pixel 12b are input to the readout amplifier 25a, which outputs a signal obtained by multiplying the difference between the input data by the predetermined gain.

Similarly, the horizontal output line 24c is connected with the holding capacitor 20d via the transfer switch 22d, and the horizontal output line 24d is connected with the holding capacitor 21d via the transfer switch 23d. That is, at this time, the dark level and signal level of the pixel 12h are input to the readout amplifier 25b, which outputs a signal obtained by multiplying the difference between the input data with the predetermined gain. After that, the control signal PH2 is negated at a time t18, thereby terminating the output operation.

With the above operations, output of the pixel signals in the mth and (m+1)th rows is completed. Note that although only two columns are described in this embodiment, the above-mentioned operations are sequentially repeated up to the last column by using the two columns as a unit.

Next, an operation of reading out pixel data in the (m+2)th and (m+3)th rows starts. At a time t19, the control signals PSEL(m) and PSEL(m+2) are activated, and the row selection switches 6 are turned on. A source follower circuit which includes the pixel amplifiers 10 of the signal transfer units 13a and 13g arranged in the mth row and the signal transfer units 13b and 13h arranged in the (m+2)th row, and the current sources 16a, 16b, 16c, and 16d connected to the vertical output lines enters an operation state.

At a time t20, the control signals PRES(m) and PRES(m+2) are activated, thereby turning on the reset switches 3. The gates 11 of the pixel amplifiers 10, that is, the capacitors 9, in the signal transfer units 13a, 13b, 13g, and 13h are initialized. That is, signals at signal levels (so-called dark levels) immediately after the reset operation are output to the vertical output lines 15a, 15b, 15c, and 15d, respectively.

At a time t21, the control signals PRES(m) and PRES(m+2) are negated. Then, at a time t22, PTN is activated. This turns on the transfer gates 19a, 19b, 19c, and 19d connected to the outputs of the column amplifiers 17a, 17b, 17c, and 17d connected to the vertical output lines 15a, 15b, 15c, and 15d, respectively. The holding capacitors 21a, 21b, 21c, and 21d hold the dark-level outputs, respectively. After the transfer operation is completed at a time t23, the control signals PTX(m+2) and PTX(m+3) are activated at a time t24, thereby turning on the transfer switches 2 of the set of the pixels 12a', 12b', 12g', and 12h'. The signal charges accumulated in the corresponding photodiode 1 are transferred to the gate 11 of the source follower formed by the pixel amplifier 10 of each of the signal transfer units 13a, 13b, 13g, and 13h. At this time, in the gate 11 of the source follower formed by the pixel amplifier 10, the electric potential varies from a reset level by an amount corresponding to the transferred signal charges, thereby settling the signal level.

At a time t25 when the transfer operation adequately ends, the control signals PTX(m+2) and PTX(m+3) are negated. Then, at a time t26, PTS is activated. This turns on the transfer gates 18a, 18b, 18c, and 18d connected to the outputs of the column amplifiers 17a, 17b, 17c, and 17d connected to the vertical output lines 15a, 15b, 15c, and 15d, respectively. The holding capacitors 20a, 20b, 20c, and 20d hold signal levels, respectively. After that, when PTS is negated at a time t27, the transfer operation is completed.

With the above operations, the holding capacitors 20a, 20b, 20c, and 20d hold the signal levels of the set of the pixels 12a', 12b', 12g', and 12h', respectively. The holding capacitors 21a, 21b, 21c, and 21d hold the dark levels of the set of the pixels 12a', 12b', 12g', and 12h', respectively.

Since the signal output operation from the pixels is complete, the row selection control signals PSEL(m) and PSEL(m+2) are negated at a time t28.

The horizontal scan circuits 27a and 27b control the transfer switches 22a, 23a, 22b, 23b, 22c, 23c, 22d, and 23d to perform an operation of connecting the holding capacitors 20a, 21a, 20b, 21b, 20c, 21c, 20d, and 21d to the horizontal output lines. When the control signal PH1 is turned on at a time t29, the horizontal output line 24a is connected with the holding capacitor 20a via the transfer switch 22a, and the horizontal output line 24b is connected with the holding capacitor 21a via the transfer switch 23a. That is, at this time, the dark level and signal level of the pixel 12a' are input to the readout amplifier 25a, which outputs a signal obtained by multiplying the difference between the input data with the predetermined gain.

Similarly, the horizontal output line 24c is connected with the holding capacitor 20c via the transfer switch 22c, and the horizontal output line 24d is connected with the holding capacitor 21c via the transfer switch 23c. That is, at this time, the dark level and signal level of the pixel 12g' are input to the readout amplifier 25b, which outputs a signal obtained by multiplying the difference between the input data with the predetermined gain. After that, the control signal PH1 is negated at a time t30, thereby terminating the output operation.

Furthermore, when the control signal PH2 is turned on at a time t31, the horizontal output line 24a is connected with the holding capacitor 20b via the transfer switch 22b, and the horizontal output line 24b is connected with the holding capacitor 21b via the transfer switch 23b. That is, at this time, the dark level and signal level of the pixel 12b' are input to the readout amplifier 25a, which outputs a signal obtained by multiplying the difference between the input data with the predetermined gain.

Similarly, the horizontal output line 24c is connected with the holding capacitor 20d via the transfer switch 22d, and the horizontal output line 24d is connected with the holding capacitor 21d via the transfer switch 23d. That is, at this time, the dark level and signal level of the pixel 12h' are input to the readout amplifier 25b, which outputs a signal obtained by multiplying the difference between the input data with the predetermined gain. After that, the control signal PH2 is negated at a time t32, thereby terminating the output operation.

With the above operations, output of the pixel signals in the (m+2)th and (m+3)th rows is completed. Note that although only two columns are described in this embodiment, the above-mentioned operations are sequentially repeated up to the last column by using the two columns as a unit.

Next, an operation of reading out the (m+4)th and (m+5)th rows starts. At a time t33, control signals PSEL(m+4) and PSEL(m+6) are activated, thereby turning on the row selection switches 6. A source follower circuit which includes the pixel amplifiers 10 of the signal transfer units 13c and 13i arranged in the (m+4)th row and the signal transfer units 13d and 13j arranged in the (m+6)th row, and the current sources 16a, 16b, 16c, and 16d connected to the vertical output lines enters an operation state.

At a time t34, control signals PRES(m+4) and PRES(m+6) are activated, thereby turning on the reset switches 3. The gates 11 of the pixel amplifiers 10, that is, capacitors 9, in the signal transfer units 13c, 13d, 13i, and 13j are initialized. That is, signals at signal levels (so-called dark levels) immediately after the reset operation are output to the vertical output lines 15b, 15a, 15d, and 15c, respectively.

At a time t35, the control signals PRES(m+4) and PRES (m+6) are negated. Then, at a time t36, PTN is activated. This turns on the transfer gates 19b, 19a, 19d, and 19c connected to the outputs of the column amplifiers 17b, 17a, 17d, and 17c connected to the vertical output lines 15b, 15a, 15d, and 15c, respectively. The holding capacitors 21b, 21a, 21d, and 21c hold the dark-level outputs, respectively. After the transfer operation is completed at a time t37, the control signals PTX (m+4) and PTX(m+5) are activated at a time t38. With this operation, the transfer switches 2 of the set of the pixels 12c, 12d, 12i, and 12j are turned on, thereby transferring the signal charges accumulated in the corresponding photodiode 1 to the gate 11 of a source follower formed by the pixel amplifier 10 of each of the signal transfer units 13c, 13d, 13i, and 13j. At this time, in the gate 11 of the source follower formed by the pixel amplifier 10, the electric potential varies from a reset level by an amount corresponding to the transferred signal charges, thereby settling the signal level.

At a time t39 when the transfer operation adequately ends, the control signals PTX(m+4) and PTX(m+5) are negated. Then, at a time t40, PTS is activated. This turns on the transfer gates 18b, 18a, 18d, and 18c connected to the outputs of the column amplifiers 17b, 17a, 17d, and 17c connected to the vertical output lines 15b, 15a, 15d, and 15c, respectively. The holding capacitors 20b, 20a, 20d, and 20c hold signal levels, respectively. After that, when PTS is negated at a time t41, the transfer operation is completed.

With the above operations, the holding capacitors 20b, 20a, 20d, and 20c hold the signal levels of the set of the pixels 12c, 12d, 12i, and 12j, respectively. The holding capacitors 21b, 21a, 21d, and 21c hold the dark levels of the set of the pixels 12c, 12d, 12i, and 12j, respectively.

Since the signal output operation from the pixels is complete, the row selection control signals PSEL(m+4) and PSEL (m+6) are negated at a time t42.

The horizontal scan circuits 27a and 27b control the transfer switches 22a, 23a, 22b, 23b, 22c, 23c, 22d, and 23d to perform an operation of connecting the holding capacitors 20a, 21a, 20b, 21b, 20c, 21c, 20d, and 21d to the horizontal output lines. When the control signal PH1 is turned on at a time t43, the horizontal output line 24a is connected with the holding capacitor 20a via the transfer switch 22a, and the horizontal output line 24b is connected with the holding capacitor 21a via the transfer switch 23a. That is, at this time, the dark level and signal level of the pixel 12d are input to the readout amplifier 25a, which outputs a signal obtained by multiplying the difference between the input data with the predetermined gain.

Similarly, the horizontal output line 24c is connected with the holding capacitor 20c via the transfer switch 22c, and the horizontal output line 24d is connected with the holding capacitor 21c via the transfer switch 23c. That is, at this time, the dark level and signal level of the pixel 12j are input to the readout amplifier 25b, which outputs a signal obtained by multiplying the difference between the input data with the predetermined gain. After that, the control signal PH1 is negated at a time t44, thereby terminating the output operation.

When the control signal PH2 is turned on at a time t45, the horizontal output line 24a is connected with the holding capacitor 20b via the transfer switch 22b, and the horizontal output line 24b is connected with the holding capacitor 21b via the transfer switch 23b. That is, at this time, the dark level and signal level of the pixel 12c are input to the readout amplifier 25a, which outputs a signal obtained by multiplying the difference between the input data by the predetermined gain.

Similarly, the horizontal output line 24c is connected with the holding capacitor 20d via the transfer switch 22d, and the horizontal output line 24d is connected with the holding capacitor 21d via the transfer switch 23d. That is, at this time, the dark level and signal level of the pixel 12i are input to the readout amplifier 25b, which outputs a signal obtained by multiplying the difference between the input data with the predetermined gain. After that, the control signal PH2 is negated at a time t46, thereby terminating the output operation.

With the above operations, output of the pixel signals in the (m+4)th and (m+5)th rows is completed. Note that although only two columns are described in this embodiment, the above-mentioned operations are sequentially repeated up to the last column by using the two columns as a unit.

Next, an operation of reading out the (m+6)th and (m+7)th rows starts. At a time t47, the control signals PSEL(m+4) and PSEL(m+6) are activated, thereby turning on the row selection switches 6. A source follower circuit which includes the pixel amplifiers 10 of the signal transfer units 13c and 13i arranged in the (m+6)th row and the signal transfer units 13d and 13j arranged in the (m+7)th row, and the current sources 16a, 16b, 16c, and 16d connected to the vertical output lines enters an operation state.

At a time t48, the control signals PRES(m+4) and PRES (m+6) are activated, thereby turning on the reset switches 3. The gates 11 of the pixel amplifiers 10, that is, the capacitors 9, in the signal transfer units 13c, 13d, 13i, and 13j are initialized. That is, signals at signal levels (so-called dark levels) immediately after the reset operation are output to the vertical output lines 15b, 15a, 15d, and 15c, respectively.

At a time t49, the control signals PRES(m+4) and PRES (m+6) are negated. Then, at a time t50, PTN is activated. This turns on the transfer gates 19b, 19a, 19d, and 19c connected to the outputs of the column amplifiers 17b, 17a, 17d, and 17c connected to the vertical output lines 15b, 15a, 15d, and 15c, respectively. The holding capacitors 21b, 21a, 21d, and 21c hold the dark-level outputs, respectively. After the transfer operation is completed at a time t51, the control signals PTX (m+6) and PTX(m+7) are activated at a time t52, thereby turning on the transfer switches 2 of the set of the pixels 12c', 12d', 12i', and 12j'. The signal charges accumulated in the corresponding photodiode 1 are transferred to the gate 11 of the source follower formed by the pixel amplifier 10 of each of the signal transfer units 13c, 13d, 13i, and 13j. At this time, in the gate 11 of the source follower formed by the pixel amplifier 10, the electric potential varies from a reset level by an amount corresponding to the transferred signal charges, thereby settling the signal level.

At a time t53 when the transfer operation adequately ends, the control signals PTX(m+6) and PTX(m+7) are negated. Then, at a time t54, PTS is activated. This turns on the transfer gates 18b, 18a, 18d, and 18c connected to the outputs of the column amplifiers 17b, 17a, 17d, and 17c connected to the vertical output lines 15b, 15a, 15d, and 15c, respectively. The holding capacitors 20b, 20a, 20d, and 20c hold signal levels, respectively. After that, when PTS is negated at a time t55, the transfer operation is completed.

With the above operations, the holding capacitors 20b, 20a, 20d, and 20c hold the signal levels of the set of the pixels 12c', 12d', 12i', and 12j', respectively. The holding capacitors 21b, 21a, 21d, and 21c hold the dark levels of the set of the pixels 12c', 12d', 12i', and 12j', respectively.

Since the signal output operation from the pixels is complete, the row selection control signals PSEL(m+4) and PSEL(m+6) are negated at a time t56.

The horizontal scan circuits 27a and 27b control the transfer switches 22a, 23a, 22b, 23b, 22c, 23c, 22d, and 23d to perform an operation of connecting the holding capacitors 20a, 21a, 20b, 21b, 20c, 21c, 20d, and 21d to the horizontal output lines. When the control signal PH1 is turned on at a time t57, the horizontal output line 24a is connected with the holding capacitor 20a via the transfer switch 22a, and the horizontal output line 24b is connected with the holding capacitor 21a via the transfer switch 23a. That is, at this time, the dark level and signal level of the pixel 12d' are input to the readout amplifier 25a, which outputs a signal obtained by multiplying the difference between the input data with the predetermined gain.

Similarly, the horizontal output line 24c is connected with the holding capacitor 20c via the transfer switch 22c, and the horizontal output line 24d is connected with the holding capacitor 21c via the transfer switch 23c. That is, at this time, the dark level and signal level of the pixel 12j' are input to the readout amplifier 25b, which outputs a signal obtained by multiplying the difference between the input data with the predetermined gain. After that, the control signal PH1 is negated at a time t58, thereby terminating the output operation.

Furthermore, when the control signal PH2 is turned on at a time t59, the horizontal output line 24a is connected with the holding capacitor 20b via the transfer switch 22b, and the horizontal output line 24b is connected with the holding capacitor 21b via the transfer switch 23b. That is, at this time, the dark level and signal level of the pixel 12c' are input to the readout amplifier 25a, which outputs a signal obtained by multiplying the difference between the input data with the predetermined gain.

Similarly, the horizontal output line 24c is connected with the holding capacitor 20d via the transfer switch 22d, and the horizontal output line 24d is connected with the holding capacitor 21d via the transfer switch 23d. That is, at this time, the dark level and signal level of the pixel 12i' are input to the readout amplifier 25b, which outputs a signal obtained by multiplying the difference between the input data with the predetermined gain. After that, the control signal PH2 is negated at a time t60, thereby terminating the output operation.

With the above operations, output of the pixel signals in the (m+6)th and (m+7)th rows is completed. Note that although only two columns are described in this embodiment, the above-mentioned operations are sequentially repeated up to the last column by using the two columns as a unit.

By performing the above readout operation as a unit for all the rows of the image sensor 101, signals for all of the pixels arranged in the image sensor 101 are respectively output. The signals output from the image sensor 101 undergo digital conversion in the AFE 103, and are then input to the image processing unit 109. The image processing unit 109 performs predetermined processing for the input signals, and then records them as a still image.

Figure 10:
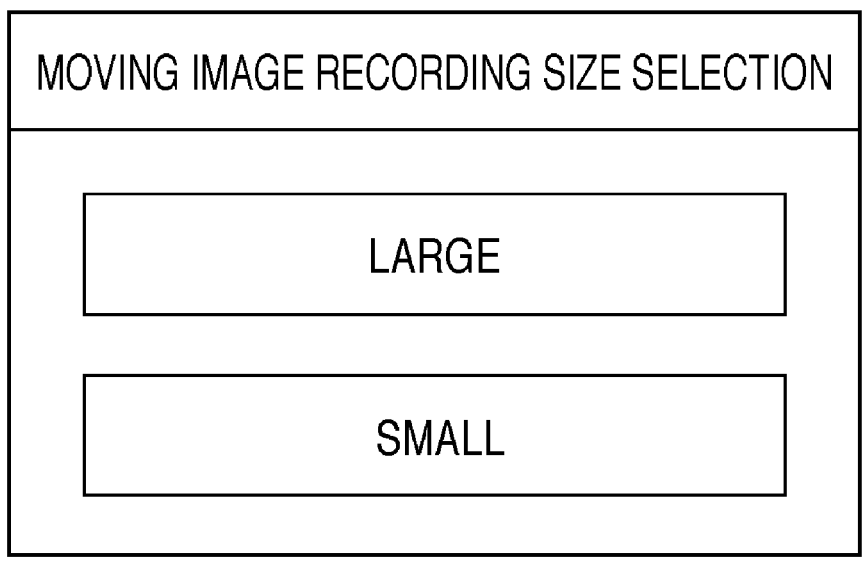
FIG. 10 is a view showing an operation selection display of the image capture apparatus according to the third embodiment of the present invention.

The first moving image capture mode will be described next. By operating the operation unit 105, a moving image recording size selection screen is displayed on the display unit 107, as shown in FIG. 10. The user selects a moving image with a large image size ("large" in FIG. 10) through the operation unit 105. Upon pressing of the moving image capture switch 105b, the CPU 104 sends settings for the first moving image capture mode to the image sensor 101 and TG 102. After that, a start signal is output to the TG 102, and the image sensor 101 starts an image capture operation based on a driving signal from the TG 102.

The image sensor 101 repeats the operation described in the first embodiment as an image capture operation, and sequentially outputs image signals. In this case, the number of output pixels is ¼ of the number of all pixels in the vertical direction. One pixel to be output is obtained by averaging signals for four pixels with the same color, which are adjacent to each other in the vertical direction within the image sensor 101. The signals output from the image sensor 101 undergo digital conversion in the AFE 103, and are then input to the image processing unit 109. The image processing unit 109 performs processing of, for example, appropriately correcting the aspect ratio of image data for the input signals, and then records them as a moving image.

The second moving image capture mode will be explained next. By operating the operation unit 105, a moving image recording size selection screen is displayed on the display unit 107, as shown in FIG. 10. The user selects a moving image with a small image size ("small" in FIG. 10) through the operation unit 105. Upon pressing of the moving image capture switch 105b, the CPU 104 sends settings for the second moving image capture mode to the image sensor 101 and TG 102. After that, a start signal is output to the TG 102, and the image sensor 101 starts an image capture operation based on a driving signal from the TG 102.

The image sensor 101 repeats the operation described in the second embodiment as an image capture operation, and sequentially outputs image signals. In this case, the number of output pixels is ⅙ of the number of all the pixels in the vertical direction. One pixel to be output is obtained by averaging signals for four pixels with the same color, which are adjacent to each other in the vertical direction within the image sensor 101. The signals output from the image sensor 101 undergo digital conversion in the AFE 103, and are then input to the image processing unit 109. The image processing unit 109 performs predetermined processing for the input signals, and then records them as a moving image.

As described above, the image capture apparatus of this embodiment can switch the number of pixels to be output from the image sensor in accordance with the operation mode. When reading out pixels without decreasing the number of rows like a still image, two vertical output lines exist for one pixel column in the vertical direction. For this reason, it is possible to read out pixels at a higher speed as compared with a case in which one vertical output line is used for an readout operation. Furthermore, in a mode wherein the number of pixels to be read out decreases, the pixels are not thinned out but pixel signals are averaged. This makes it possible to acquire the information of a larger number of pixels, thereby maintaining high image quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-014674, filed Jan. 26, 2010, which is hereby incorporated by reference herein in its entirety.

What is claimed is:

1. An image sensor having a plurality of pixels two-dimensionally arranged in a row direction and a column direction, comprising:
a plurality of pixel amplifiers which are arranged in the column direction for each column, and one of which is shared by at least two pixels of each column;
two output lines arranged for each column, to either of which signals are output from said plurality of pixel amplifiers arranged in the column direction for each column, wherein said two output lines arranged for each column alternately run to an upper side and lower side of said image sensor depending on whether the corresponding column is an odd numbered column or an even numbered column;
an averaging unit which averages signals output from said two output lines arranged for the same column;
a first readout circuit which is for said two output lines in the even numbered column and is arranged in the upper side or lower side of said image sensor, and
a second readout circuit which is for said two output lines in the odd numbered column and is arranged in an opposite side of the first readout circuit of said two output lines in the even numbered column.

2. The image sensor according to claim 1, wherein at least two pixels which share said pixel amplifier are adjacent to each other in the column direction, and have the same color.

3. The image sensor according to claim 1, wherein averaging processing by said averaging unit is performed for every four pixels which are successively arranged in the column direction and have the same color.

4. The image sensor according to claim 1, wherein averaging processing by said averaging unit is performed for every six pixels which are successively arranged in the column direction and have the same color.

5. An image capture apparatus comprising:
an image sensor having a plurality of pixels two-dimensionally arranged in a row direction and a column direction, and including a plurality of pixel amplifiers which are arranged in the column direction for each column and one of which is shared by at least two pixels of each column, two output lines arranged for each column, to either of which signals are output from said plurality of pixel amplifiers arranged in the column direction for each column wherein said two output lines arranged for each column alternately run to an upper side and lower side of said image sensor depending on whether the corresponding column is an odd numbered column or an even numbered column, an averaging unit which averages signals output from said two output lines arranged for the same column, a first readout circuit which is for said two output lines in the even numbered column and is arranged in the upper side or lower side of said image sensor, and a second readout circuit which is for said two output lines in the odd numbered column and is arranged in an opposite side of the first readout circuit of said two output lines in the even numbered column; and
a signal processing unit which performs predetermined signal processing for an image signal output from said image sensor.

* * * * *